US012223601B2

(12) United States Patent
Madonna et al.

(10) Patent No.: US 12,223,601 B2
(45) Date of Patent: *Feb. 11, 2025

(54) THREE DIMENSIONAL VIRTUAL ROOM-BASED USER INTERFACE FOR A HOME AUTOMATION SYSTEM

(71) Applicant: Savant Systems, Inc., Hyannis, MA (US)

(72) Inventors: Robert P. Madonna, Osterville, MA (US); Maxwell R. Madonna, Santa Monica, CA (US); David W. Tatzel, West Yarmouth, MA (US); Michael A. Molta, Nantucket, MA (US); Timothy Kallman, Hyannis, MA (US)

(73) Assignee: Savant Systems, Inc., Hyannis, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/201,046

(22) Filed: May 23, 2023

(65) Prior Publication Data

US 2023/0290073 A1 Sep. 14, 2023

Related U.S. Application Data

(63) Continuation of application No. 17/018,886, filed on Sep. 11, 2020, now Pat. No. 11,688,140.
(Continued)

(51) Int. Cl.
G06T 19/00 (2011.01)
G06T 15/20 (2011.01)
(Continued)

(52) U.S. Cl.
CPC ............ *G06T 19/003* (2013.01); *G06T 15/20* (2013.01); *G06T 15/503* (2013.01);
(Continued)

(58) Field of Classification Search
None
See application file for complete search history.

(56) References Cited

U.S. PATENT DOCUMENTS 6,160,359 A 12/2000 Fleischmann
6,463,343 B1 10/2002 Emens et al.
(Continued)

FOREIGN PATENT DOCUMENTS

CN 1692672 A 11/2005
CN 1914655 A 2/2007
(Continued)

OTHER PUBLICATIONS

Eckstein, Benjamin, et al., "Smart Substitutional Reality: Integrating the Smart Home into Virtual Reality," Elsevier B. V., ScienceDirect, Entertainment Computing, vol. 31, Jun. 19, 2019, pp. 1-10.
(Continued)

Primary Examiner — Nurun Flora
(74) Attorney, Agent, or Firm — Cesari and McKenna, LLP; James A. Blanchette

(57) ABSTRACT

In one embodiment, a user-navigable 3-D virtual room-based user interface for a home automation system is provided. A control app renders and displays the user-navigable 3-D virtual room from a perspective defined by a virtual camera, wherein the control app renders the user-navigable 3-D virtual room based on data from at least one of a plurality of 2-D images of the physical room captured from different respective positions in the physical room. In response to an explicit navigation command or implicit action, the control app alters a position or orientation of the virtual camera. The control app re-renders and displays the user-navigable 3-D virtual room from a new perspective defined by the altered position or orientation, wherein the new perspective does not coincide with the position in the physical room from which any of the 2-D images were
(Continued)

captured, by blending data from multiple 2-D images captured from different positions.

28 Claims, 16 Drawing Sheets

Related U.S. Application Data

(60) Provisional application No. 62/898,941, filed on Sep. 11, 2019.

(51) Int. Cl.
  *G06T 15/50* (2011.01)
  *H04L 12/28* (2006.01)

(52) U.S. Cl.
  CPC ........ *G06T 15/506* (2013.01); *H04L 12/2814* (2013.01); *H04L 12/282* (2013.01); *H04L 12/2829* (2013.01); *H04L 2012/285* (2013.01)

(56) References Cited

U.S. PATENT DOCUMENTS

| | | |
|---|---|---|
| 6,756,998 B1 | 6/2004 | Bliger |
| 7,047,092 B2 | 5/2006 | Wimsatt |
| 7,061,488 B2 | 6/2006 | Randel |
| 7,167,777 B2 | 1/2007 | Budike, Jr. |
| 7,529,838 B2 | 5/2009 | Primm et al. |
| 7,760,107 B1 | 7/2010 | Stepps et al. |
| RE42,289 E | 4/2011 | Vincent |
| 8,042,049 B2 | 10/2011 | Killian et al. |
| 8,122,131 B2 | 2/2012 | Baum et al. |
| 8,296,669 B2 | 10/2012 | Madonna et al. |
| 8,352,079 B2 | 1/2013 | Wendt |
| 9,055,627 B2 | 6/2015 | Madonna et al. |
| 10,146,398 B2 | 12/2018 | Madonna et al. |
| 10,613,704 B2 | 4/2020 | Madonna et al. |
| 10,775,960 B2 | 9/2020 | Madonna et al. |
| 10,802,668 B2 | 10/2020 | Madonna et al. |
| 11,018,939 B1 | 5/2021 | Harris |
| 2002/0067355 A1 | 6/2002 | Randel |
| 2004/0160199 A1 | 8/2004 | Morgan et al. |
| 2004/0260427 A1 | 12/2004 | Wimsatt |
| 2005/0035846 A1 | 2/2005 | Zigmond et al. |
| 2005/0097478 A1 | 5/2005 | Killian et al. |
| 2006/0098112 A1 | 5/2006 | Kelly |
| 2006/0218591 A1 | 9/2006 | Billmaier et al. |
| 2006/0288368 A1 | 12/2006 | Huslak et al. |
| 2007/0171091 A1 | 7/2007 | Nisenboim et al. |
| 2007/0265121 A1 | 11/2007 | Gross |
| 2007/0268121 A1 | 11/2007 | Vasefi et al. |
| 2007/0288849 A1 | 12/2007 | Moorer et al. |
| 2008/0127063 A1 | 5/2008 | Silva et al. |
| 2008/0168349 A1 | 7/2008 | Lamiraux et al. |
| 2008/0200205 A1 | 8/2008 | Liu et al. |
| 2008/0265797 A1 | 10/2008 | Van Doorn |
| 2008/0270937 A1 | 10/2008 | Poulet et al. |
| 2009/0066534 A1 | 3/2009 | Sivakkolundhu |
| 2009/0083634 A1 | 3/2009 | Madonna et al. |
| 2009/0303197 A1 | 12/2009 | Bonczek et al. |
| 2010/0157018 A1 | 6/2010 | Lampotang et al. |
| 2010/0164878 A1 | 7/2010 | Bestle et al. |
| 2010/0185969 A1 | 7/2010 | Wendt et al. |
| 2010/0211897 A1 | 8/2010 | Cohen et al. |
| 2010/0277107 A1 | 11/2010 | Baaijens et al. |
| 2010/0312366 A1 | 12/2010 | Madonna et al. |
| 2011/0273114 A1 | 11/2011 | Ogg et al. |
| 2012/0084472 A1 | 4/2012 | Locascio et al. |
| 2012/0284672 A1* | 11/2012 | Madonna ............ G06F 3/0482 715/850 |
| 2013/0068832 A1 | 3/2013 | Li et al. |
| 2013/0215148 A1 | 8/2013 | Antonyuk et al. |
| 2014/0059460 A1 | 2/2014 | Ho |
| 2014/0181704 A1 | 6/2014 | Madonna et al. |
| 2015/0035823 A1 | 2/2015 | Arsan et al. |
| 2015/0193127 A1 | 7/2015 | Chai et al. |
| 2015/0301716 A1 | 10/2015 | Madonna et al. |
| 2016/0093078 A1 | 3/2016 | Davis et al. |
| 2016/0120009 A1 | 4/2016 | Aliakseyeu et al. |
| 2016/0270195 A1 | 9/2016 | Ikehara et al. |
| 2018/0144547 A1 | 5/2018 | Shakib et al. |
| 2019/0004677 A1 | 1/2019 | Madonna et al. |
| 2020/0026420 A1 | 1/2020 | Sicard |
| 2020/0213662 A1 | 7/2020 | Wolcott et al. |
| 2020/0218427 A1 | 7/2020 | Madonna et al. |
| 2021/0074062 A1 | 3/2021 | Madonna et al. |

FOREIGN PATENT DOCUMENTS

| | | |
|---|---|---|
| CN | 102034341 | 4/2011 |
| CN | 102461344 A | 5/2012 |
| CN | 104021585 A | 9/2014 |
| CN | 104396282 A | 3/2015 |
| CN | 105446144 A | 3/2016 |
| CN | 106255996 A | 12/2016 |
| DE | 100 12 508 A1 | 9/2001 |
| DE | 10314134 A1 | 10/2003 |
| EP | 1986474 A2 | 10/2008 |
| JP | H07-073978 | 8/1993 |
| JP | 2002-245102 | 2/2001 |
| JP | 2004-135051 A | 4/2004 |
| JP | 2004-534355 | 11/2004 |
| JP | 2005-098043 | 4/2005 |
| JP | 2012-529147 | 11/2012 |
| JP | 2016-525732 A | 8/2016 |
| JP | 2016-167385 A | 9/2016 |
| JP | 2017-122983 A | 7/2017 |
| KR | 1020120027454 A | 3/2012 |
| KR | 1020160125439 A | 10/2016 |
| RU | 53510 U1 | 5/2006 |
| WO | WO-2002/099780 A2 | 12/2002 |
| WO | WO-2002-103841 A1 | 12/2002 |
| WO | WO-2009/004531 A1 | 1/2009 |
| WO | WO-2009-061014 A1 | 5/2009 |
| WO | WO-2010/141076 A1 | 12/2010 |
| WO | WO-2013/137191 | 9/2013 |
| WO | WO-2015-130475 A1 | 9/2015 |

OTHER PUBLICATIONS

"HomeRunner: User Manual," JDS Technologies, Feb. 2007, pp. 1-12.

Hossain, SK Alamgir, et al., "Bringing Virtual Events into Real Life in Second Life Home Automation System," IEEE, 2011 IEEE International Conference on Virtual Environments Human-Computer Interfaces and Measurement Systems (VECIMS), Sep. 19, 2011, pp. 1-5.

"Pocket WebX: Installation and Operation Manual, "JDS Technologies, Feb. 2004, pp. 1-12.

"Notification of Transmittal of the International Search Report and the Written Opinion of the International Searching Authority, or the Declaration," International Filing Date: Jun. 2, 2010, International Application No. PCT/US2010/001600, Applicant: Savant Systems, LLC. , Date of Mailing: Sep. 3, 2010, pp. 1-14.

"Notification of Transmittal of the International Search Report and the Written Opinion of the International Searching Authority, or the Declaration," International Filing Date: Feb. 12, 2015, International Application No. PCT/US2015/015628, Applicant: Savant Systems, LLC, Date of Mailing: Apr. 29, 2015, pp. 1-9.

"Notification of Transmittal of the International Search Report and the Written Opinion of the International Searching Authority, or the Declaration," International Filing Date: Sep. 6, 2018, International Application No. PCT/US2018/049712, Applicant: Savant Systems, LLC, Date of Mailing: Nov. 28, 2018, pp. 1-14.

"Notification of Transmittal of the International Search Report and the Written Opinion of the International Searching Authority, or the Declaration," International Filing Date: Sep. 11, 2020, International Application No. PCT/US2020/050403, Applicant: Savant Systems, Inc., Date of Mailing: Dec. 11, 2020, pp. 1-20.

(56) References Cited

OTHER PUBLICATIONS

U.S. Appl. No. 13/551,289, Filed: Jul. 17, 2012 by Robert P. Madonna, et al. for a Virtual Room-Based Light Fixture and Device Control, 1-50.
U.S. Appl. No. 17/018,556, Filed: Sep. 11, 2020 by Andrew R. Hamm, et al. for Circadian Lighting in a Diverse Home Automation System, 1-32.
Boers, Nicholas, et al., "The Smart Condo: Visualizing Independent Living Environments in a Virtual World," IEEE, IEEE Xplore, PervasiveHealth, 2009 3rd International Conference on Pervasive Computing Technologies for Healthcare, PervasiveHealth 2009, London, UK, Apr. 1-3, 2009, pp. 1-8.
Borodulkin, L., et al., "3D Virtual ,Smart home User Interface," VIMS2002 International Symposium on Virtual and Intelligent Measurement Systems, Mt. Alyeska Resort, AK, USA, May 18-20, 2002, pp. 1-5.
Burns, Nicholas Brent, et al., "PESTO: Data Integration for Visualization and Device Control in the SmartCare Project", IEEE, The First IEEE International Workshop on Pervasive Technologies and Care Systems for Sustainable Aging-in-Place, 2016 IEEE International Conference on Pervasive Computing and Communication Workshops (PERCOM Workshops), Mar. 14, 2016, pp. 1-6.
"Chinese Search Report for Chinese Application No. 201880058065. 8", dated Mar. 28, 2024, pp. 1-3.
Fleck, Sven, et al., "3D Surveillance-A Distributed Network of Smart Cameras for Real-Time Tracking and its Visualization in 3D," IEEE, IEEE Xplore, IEEE Computer Society, Proceedings of the 2006 Conference on Computer Vision and Pattern Recognition Workshop (CVPRW'06), New York, NY, USA, Jun. 17-22, 2006, pp. 1-9.
Musolesi, Mirco, et al., "The Second Life of a Sensor: Integrating Real-world Experience in Virtual Worlds Using Mobile Phones," ACM, Proceedings of the Fifth ACM Workshop on Embedded Networked Sensors (HotEmNets 2008), EmNets '08, Charlottesville, Virginia, USA, Jun. 2-3, 2008, pp. 1-5.
Thompson, Craig W., et al., "Modeling Healthcare Logistics in a Virtual World," IEEE, IEEE Xplore, The IEEE Computer Society, IEEE Internet Computing, Architectural Perspectives, Sep./Oct. 2008, pp. 100-104.
Bae, Hyojoon, et al., "High-Precision Vision-Based Mobile Augmented Reality System for Context-Aware Architectural, Engineering, Construction and Facility Management (AEC/FM) Applications", Springer, Visualization in Engineering a SpringerOpen Journal 2013, vol. 1, No. 3, Jun. 12, 2013, pp. 1-13.
Heun, Valentin, et al., "Reality Editor: Programming Smarter Objects", ACM, Association for Computing Machinery, UbiComp'13 Adjunct, UbiComp '13: The 2013 ACM International Joint Conference on Pervasive and Ubiquitous Computing, Zurich, Switzerland, Sep. 8-12, 2013, pp. 307-310.
"ImageJ Image Processing and Praxis", Sun Shuifa, Dong Fangmin National Defense Industry Press, dated Dec. 31, 2013, pp. 1-6.
"Photoshop CSC From Beginner to Master", Xin Zhi Hu Dong, China Railway Publishing House, dated Nov. 20, 2012, pp. 1-5.

* cited by examiner

THREE DIMENSIONAL VIRTUAL ROOM-BASED USER INTERFACE FOR A HOME AUTOMATION SYSTEM

RELATED APPLICATIONS

The present application is a continuation of U.S. patent application Ser. No. 17/018,886, now U.S. Pat. No. 11,688,140, filed on Sep. 11, 2020 by Robert P. Madonna et al., for a "Three Dimensional Virtual Room-Based User Interface for a Home Automation System", which claims priority to U.S. Provisional Patent Application No. 62/898,941 filed on Sep. 11, 2019 by Robert P. Madonna et al., for a "Three Dimensional Virtual Room-Based User Interface for a Home Automation System," the contents of both of which are incorporated herein by reference in their entirety.

BACKGROUND

Technical Field

The present disclosure relates generally to device control and more specifically to a user interface to control devices in a home automation system.

Background Information

As homes and other structures become larger, and become filled with more devices, device control becomes an increasing challenge. Traditionally, many devices have been controlled by mechanical switches. While mechanical switches are reliable and cost-effective, they have many limitations, especially when there are many devices located in the same room of a structure. For example, a large room may include a large number of lighting devices, display devices, electronic window blinds, heating ventilation and air conditioning (HVAC) devices, etc. To control all these devices, a large number of mechanical switches may be needed. As the number of mechanical switches increases within the room, usability decreases. Mechanical switches often are unlabeled, or if labeled, marked with only cryptic descriptions (e.g., "Lamp 1", "Lamp 2", etc.). A user may be forced to memorize which of the many mechanical switches available in the room controls which device. A user who has not memorized this relationship typically must rely upon trial and error, flipping switches until they happen upon the result they desire.

A variety of types of home automation systems have been developed that attempt to improve upon the shortcomings of mechanical switches. Such systems typically include one or more controllers that manage the operation of devices. The controllers may be interacted with via user interface devices, such as dedicated touch screen units, that provide a user interface for controlling the devices. The user interface may include an array of touch-sensitive buttons or sliders, where each button or slider controls a device or a group of devices.

However, such button-centric on-screen user interfaces share many of the same shortcomings as mechanical switches. While the buttons and sliders are shown on a screen, rather than existing physically like mechanical switches, they operate very similarly. By looking at an on-screen button or slider, it may not be apparent what the button or slider does. While a label may be provided, often such labels are short and cryptic, given the constraints of screen space. While the label may make sense to the installer configuring the system, it may have little intrinsic meaning to a user. Similar to the case with mechanical switches, the user may have to touch each on-screen button or slide each slider to discover by trial and error what button or slider achieves a desired result.

More recently, a device control solution has been developed that addresses many of the shortcomings of mechanical switches and button-centric on-screen user interfaces. This solution provides a user interface that includes one or more fixed-perspective, two-dimensional (2-D) virtual rooms displayed on a touch screen. Each virtual room shows a 2-D depiction of a corresponding physical room of the structure. By touching a depiction of a device within a fixed-perspective, 2-D virtual room shown on the screen, a user may indicate a state change for the device that is performed by the home automation system in the physical room. When the state of the device is changed in the physical room, the appearance of the fixed-perspective, 2-D virtual room is updated to show the changed state.

While this type of solution solves many of the shortcomings of mechanical switches and button-centric on-screen user interfaces, and represents a notable advance, it still can be improved upon. One issue with an interface based on fixed-perspective, 2-D virtual rooms is that it requires a user be familiar with the floorplan of the structure and the specific names of each room. The user may be presented with a number of different fixed-perspective, 2-D virtual rooms in the interface, and need to select among them. As the user moves about the structure, and desires to control devices in different physical rooms, this selection needs to be repeated. If the user is not familiar with the floorplan of the structure and what each room is called, they may need to resort to trial and error to select the correct virtual room to use to implement the changes they desire.

Another issue with an interface based on fixed-perspective, 2-D virtual rooms is that some types of state changes may either not be easily represented or do not appear "natural". According to prior techniques, a fixed-perspective, 2-D virtual room is generated by capturing a plurality of 2-D images (e.g., photographs) of the physical room in different states from the same, preselected perspective, including an all-off 2-D image and device-specific images with one device activated and all other devices deactivated. Various ones of the plurality of images are filtered together to generate the fixed-perspective, 2-D virtual room with devices in different combinations of states. While such filtering works well for some types of state changes (e.g., some illumination state changes), it is not practical for other types of state changes (e.g., colored illumination states, media content states, electronic blind positions, gas fireplace flame settings, etc.), for which appearance is not well reproduced by combining a small number of 2-D images. For example, some colored lighting devices are capable of producing a large number of colors (e.g., 32 bit color). The appearance of all such colors in a physical room may not be readily simulated by filtering together a small number of 2-D images; there are simply too many possibilities. Likewise, media content states on a television (e.g., channel, source, file, etc.) may not be readily simulated by filtering together a small number of 2-D images; the needed information is simply not there. Likewise, filtering does not always fully recreate the nuances of how multiple devices interact to affect the appearance of the physical room. For example, interactions of natural sunlight caused by electronic blind positions, artificial light from lighting devices, and ambient light from gas fireplace flame, etc. may not be well reproduced by simply filtering together a small number of 2-D images.

Another issue with an interface based on fixed-perspective, 2-D virtual rooms is that is it may be difficult to pre-select pleasing perspectives for some room shapes or device arrangements. Typically, an installer will preselect a small number of perspectives from which to capture 2-D images that show a number of devices, at a reasonable size, with a minimum of occlusions. For certain rooms with complex shapes, unusual arrangements of devices, and the like, it may be difficult or impossible to preselect a small number of perspectives that well meet these objectives. While a fixed-perspective, 2-D virtual room-based user interface may still be generated, its usability may be decreased.

Accordingly, there is a need for an improved virtual room-based user interface for controlling a home automation system that may address some or all of these issues.

SUMMARY

In one embodiment, a user-navigable, three-dimensional (3-D) virtual room-based user interface for a home automation system is provided. Each user-navigable 3-D virtual room shows a substantially photo-realistic depiction of a corresponding physical room of the structure, including substantially photo-realistic depictions of boundaries of the physical room (e.g., the walls, ceiling, floor, etc.), furnishings present in the physical room (e.g., sofas, chairs, beds, wall-hangings, etc.), and devices present in the physical room (e.g., lighting devices, display devices, electronic window blinds, HVAC devices, and/or other types of devices) that are under the control of the home automation system. A user may use explicit navigation commands (e.g., movement commands or node selections) or implicit actions (e.g., movement of a device as detected using positioning beacons and/or an orientation sensor) to navigate within the user-navigable 3-D virtual room, moving a virtual camera in 3-D space to view the virtual room from different perspectives. By interacting with (e.g., touching, clicking on, etc.) substantially photo-realistic depictions of the devices within the user-navigable 3-D virtual room, a user may indicate changes to the state of corresponding devices in the physical room. As the state of devices in the physical room is changed, a 3-D graphics engine may dynamically update the appearance of the user-navigable 3-D virtual room to reflect the changes, such that what a user views within the virtual room will mimic their experience within the corresponding physical room. The user may more easily navigate the 3-D virtual room-based interface than prior interfaces, as they can travel through 3-D space and observe relationships of rooms. Further, a 3-D virtual room may be able to show previously hard to represent states and appearance effects, leveraging the 3-D graphics engine. Still further, the 3-D virtual room may be more adaptable to various room shapes and device arrangements.

The user-navigable, 3-D virtual room-based user interface may be generated using a 3-D mesh model and 2-D images of the physical room. In an example process, an installer places a 3-D camera at a plurality of positions in a physical room and captures a plurality of overlapping sets of 2-D images (e.g., 2-D panoramic images) and a 3-D space model (e.g., a 3-D mesh). The overlapping 2-D images (e.g., 2-D panoramic images) and 3-D space model (e.g., a 3-D mesh) are imported into a stitching application which links (i.e. stiches) image data to corresponding locations in the 3-D space model. The stitched 2-D images (e.g., 2-D panoramic images) and 3-D space model (e.g., 3-D mesh) are imported into a 3-D modeling application. The installer utilizes the 3-D modeling application to correct visual artifacts, and to tag depictions of devices with hit regions that are mapped to properties of the devices and control commands recognized for changing state of the devices. The installer further utilizes the 3-D modeling application to assign appearance changes to the depictions of devices that coincide with the properties and control commands. The assigned appearance changes define how appearance should be updated to coincide with changes in the physical room when the control commands are issued. Thereafter, the stitched, artifact-corrected, tagged, appearance assigned, 2-D images and 3-D space models (now referred to as virtual rooms) are exported to a control app that may be used by a user to control the home automation system and its devices.

When the virtual camera in a virtual room is at a position that corresponds with the position from which one of the of 2-D images (e.g., 2-D panoramic images) was captured, the 3-D graphics engine of the control app may display data from the 2-D image (e.g., 2-D panoramic images), adding in the appearance changes as needed. When the virtual camera is moved through positions that do not correspond with any of the position of 2-D image (e.g., 2-D panoramic images), the 3-D graphics engine of the control app blends (e.g., changes alpha channel and render layers of) available 2-D images with the 3-D space model (e.g., 3-D mesh), and displays the blended data, adding in the appearance changes as needed.

It should be understood that a variety of additional features and alternative embodiments may be implemented. This Summary is intended simply as a brief introduction to the reader, and does not indicate or imply that the examples mentioned herein cover all aspects of the invention, or are necessary or essential aspects of the invention.

BRIEF DESCRIPTION OF THE DRAWINGS

The description below refers to the accompanying drawings, of which:

FIGS. 2H-2I are screen shots of the example user-navigable 3-D virtual room of FIG. 2A, illustrating changes to state of a display device in response to user interaction with a depiction of the display device;

DETAILED DESCRIPTION

Definitions

As used herein, the term "home automation system" should be interpreted broadly to encompass various types of home control, "smart home", and/or device control systems that may control devices e.g., lighting devices, display devices, electronic window blinds, HVAC devices, and/or other types of devices) within a structure, such as a residential dwelling or commercial building.

As use herein, the term "physical room" refers to an interior portion of a physical structure or an exterior space associated with a physical structure, in which one or more devices may provide services.

As user herein, the term "virtual room" refers to a digital twin of a physical room that is represented by a depiction of an interior portion of a physical structure or an exterior space associated with a physical structure.

As used herein, the term "mobile device" refers to an electronic device that executes a general-purpose operating system and is adapted to be transported on one's person. Devices such as smartphones should be considered mobile devices. Desktop computers, servers, or other primarily-stationary computing devices generally should not be considered mobile devices.

An Example Home Automation System

Figure 1:
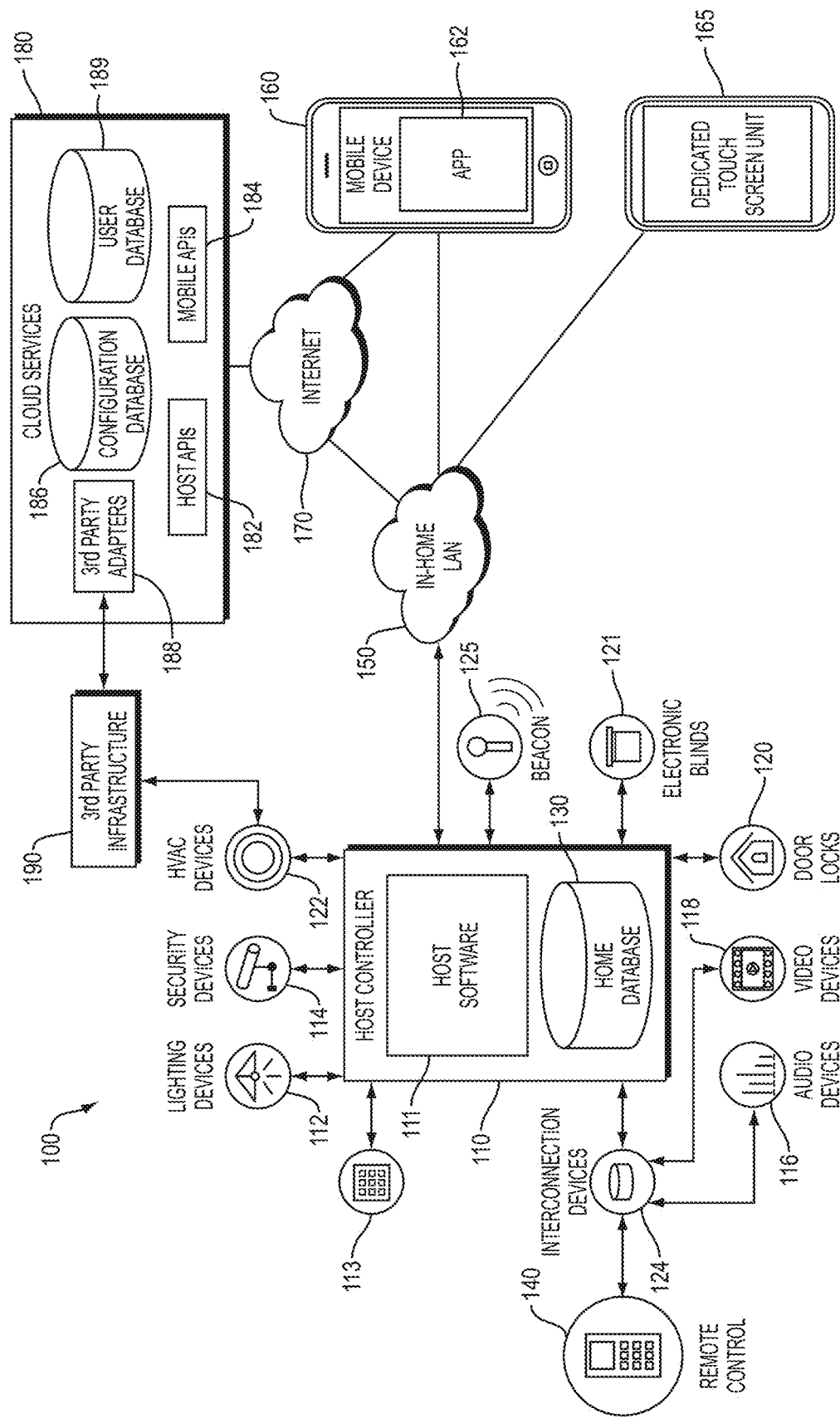
FIG. 1 is a block diagram of an example architecture of a home automation system operable to control devices in rooms of a structure (e.g., a residential dwelling or commercial building)

FIG. 1 is a block diagram of an example architecture 100 of a home automation system operable to control devices in rooms of a structure (e.g., a residential dwelling or commercial building). At the core of the system is a host controller 110 coupled to an in-home local area network (LAN) (e.g., a wired network such as Ethernet and/or a wireless network such as Wi-Fi) 150. The host controller may include hardware components such as a processor, a memory and a storage device, which collectively store and execute host software 111 configured to monitor and control the operations of devices 112-124, utilize beacons 125, provide UI interpretation, system administration and monitoring, synchronization with cloud services 180, remote controls 140, mobile devices 160, and other electronic devices 165 used to control the system, provide activity recording services, provide activity prediction services and/or other types of functionality. The host controller 110 may maintain in its storage device a home database 130 that stores configuration information including information regarding devices 112-124 controlled by the home automation system and services the devices are able to provide as well as information about controls 140, mobile devices 160, and other electronic devices 165 used to control the system.

The devices 112-124 of the home automation system may include lighting devices 112, such as light fixtures, dimmer modules, and the like; interface devices 113, such as keypads, switches, touch screens and the like; security devices 114, such as home monitors/cameras, motion sensors, home healthcare sensors, related controllers and the like; audio devices 116 and video devices 118 (collectively A/V devices), such as display devices (e.g., televisions, monitors, etc.), A/V device controllers, media servers, audio amplifiers, cable boxes, and the like; electronic door locks 120; electronic window blinds 121 and other types of motor-operated devices (e.g., television lifts, automatic doors, etc.) that produce motion in the room, and the like; HVAC devices 122, such as thermostat-controlled heating and cooling systems, gas fireplaces, whole house fans, and the like; interconnection devices 124, such as IR blasters, matrix switchers, signal extenders and the like; as well as other types of home automation system devices. Each of the devices 112-124 may be associated with (i.e. configured to be used in connection with) a physical room of the structure and as such be said to be "in" the room. It should be understood that, when used in this context, the term "in" should be interpreted to embrace a device physically residing within the room, or reside elsewhere (e.g., a remote equipment rack) and providing services into the room from such remote location.

Depending on the implementation, the communications capabilities of the devices 112-124 of the home automation system may vary. For example, at least some of the devices may include a LAN interface (e.g., an Ethernet or Wi-Fi adaptor) and/or a wireless personal area network (WPAN) interface (e.g., a Bluetooth or Bluetooth low Energy (BLE) adaptor) to enable them to communicate with the host controller 110 and other devices. Likewise, some devices may only have ports or transceivers for wired or point-to-point wireless communication (e.g., RS-232, RS-485, general-purpose input/output (GPIO), infrared (IR), etc.) and communicate with the host controller 110 and other devices using such technologies. Some of the devices (e.g., an interconnection device such as an IR blaster) may bridge different type of communication, for example, include both a WPAN interface (e.g., a Bluetooth or BLE adaptor) and a point-to-point wireless transceiver (e.g., an IR transceiver) and bridge therebetween. Further, some devices may include a LAN interface (e.g., an Ethernet or Wi-Fi interface), but not be configured to communicate with the host controller 110 or other devices of the home automation system, directly over the in-home LAN 150. Instead they may access the Internet 170 and cloud services 180 and/or third party infrastructure 190, which in turn may communicate back with the host controller 110. It should be understood that some HVAC devices 122 shown in FIG. 1 may communicate in this manner. In addition, or alternatively, other types of devices 112-124 may communicate in this manner.

The home automation system may include a number of positioning beacons that transmit and receive WLAN, WPAN or other wireless signals (e.g., Bluetooth, BLE, Wi-Fi, ultra wideband (UWB), radio frequency identifier (RFID) or other signals) usable to determine the position of a remote control 140, mobile device 160 or other electronic device 165 within the structure. Position may be determined using received signal strength (RSS) to select a nearest beacon location, to perform trilateration based on multiple beacons locations and signal strengths associated therewith, and/or other techniques. These beacons may be stand-alone devices, such as stand-alone beacons 125, or integrated into one or more of the devices 112-124 that provide other functions. In one implementation, beacons are integrated into lighting devices 112 and keypads, and the lighting devices 112 provide both an illumination and a positioning function and the keypads provide both a user-interface and positioning function.

A user may control the devices 112-124 of the home automation system using a remote control 140. The remote control 140 may include a touch sensitive display screen, physical buttons, communications interfaces (e.g., IR, WPAN, etc.), a processor, a memory and a storage device that stores and executes a control app configured to interface with the host controller 110 and cloud services 180. The remote control may also include an orientation sensor, which together with the positioning beacons permits determination of a position and orientation of the remote control 140 about the structure. The control app on the remote control 140 may present a user-navigable, 3-D virtual room-based user interface for controlling the devices 112-124 of the home automation system 100, among other functionality.

A user may also control the devices 112-124 of the home automation system using a mobile device 160. The mobile device 160 may include a touch sensitive display screen, communications interfaces (e.g., Wi-Fi, WPAN, etc.), a processor, a memory and a storage device that stores and executes a control app 162 configured to interface with the host controller 110 and/or cloud services 180. The mobile device 160 may also include an orientation sensor, which together with the positioning beacons permits determination of a position and orientation of the mobile device 160 about the structure. The control app on the mobile device 160 may present a user-navigable, 3-D virtual room-based user interface for controlling the devices 112-124 of the home automation system 100, among other functionality.

Still further, a user may control the devices 112-124 of the home automation system using another electronic device 165, such as a tablet computer, a head-mounted display (HMD) such as the Google Glass® HUD, a dedicated touch screen unit, a television and remote control, a computer and mouse, or other type of technology. The electronic device 165 may include a display screen (e.g., touch sensitive, non-touch sensitive, HMD, etc.), an input device, communications interfaces (e.g., Wi-Fi, WPAN, etc.), a processor, a memory and a storage device that stores and executes software configured to interface with the host controller 110 and/or cloud services 180.

The electronic device 165 may also include an orientation sensor, which together with the positioning beacons permits determination of a position and orientation of the electronic device 165 about the structure. For example, in an implantation where the electronic device 165 is a HMD, and the beacons are BLE beacons, position may be determined by BLE trilateration and orientation may be determined by head movement. The control app may present a 3-D virtual room-based user interface for controlling the devices 112-124 of the home automation system on the HMD, and the user may make selections with an input device of the HMD.

It should be understood that the electronic devices 165 may also include multiple individual devices operating together. For example, in an implantation where the electronic device 165 is a television and remote control, the control app may present a 3-D virtual room-based user interface on the screen of the television and selections may be received on the remote control (e.g., by moving a cursor on the screen to select items).

The remote control 140, mobile device 160 or electronic device 165 may communicate with the host controller 110 to effect device control. Some devices (e.g., mobile device 160, electronic device 165, etc.) may communicate with cloud services 180 and its host application program interfaces (APIs) 182 and mobile APIs 184. The cloud services 180 may provide remote access to home automation control, a persistent backup of the home database 130 (storing data in a configuration database 186), interfaces to third party infrastructure (via third party adaptors 188), user profiles and usage tracking (storing data in a user database 189), a mechanism for over-the-air updates, host crash reporting, and license management, among other functions.

Operation of a User-Navigable 3-D Virtual Room-Based User Interface

The control app on the remote control 140, the mobile device 160 or other electronic device 165 may present a 3-D virtual room-based user interface for controlling the devices 112-124 of the home automation system 100. The interface may include a plurality of user-navigable 3-D virtual rooms that each show a substantially photo-realistic depiction of a corresponding physical room of the structure. Each user-navigable 3-D virtual room may include substantially photo-realistic depictions of boundaries of the physical room (e.g., the walls, ceiling, floor, etc.), furnishings present in the physical room (e.g., sofas, chairs, beds, wall-hangings, etc.), and devices 112-124 present in the physical room (e.g., lighting devices, display devices, electronic window blinds, and/or other types of devices). Each of the devices 112-124 may have a number of possible states. Depending on the device 112-124, there may be a binary set of possible states (e.g., an inactive "off" state and an active "on" state) or a more numerous set of states (e.g., multiple illumination levels, colors (e.g., 32 bit color), color temperatures (e.g. 3000K, 5000K etc.), media content (e.g., television channel, source, individual media file, etc.), position, temperature, etc.).

FIGS. 2A-2M are screen shots of an example user-navigable 3-D virtual room that may be displayed by the control app corresponding to an open-floorplan kitchen and living room of a physical structure. While the screen shots of FIGS. 2A-2L are of low resolution and contains visual artifacts, it should be understood that a commercial implementation will preferably be of high resolution with such artifacts corrected, such that it appears substantially photo-realistic. FIG. 2M shows an example that more closely approximates the preferred appearance of a commercial implementation.

Figure 2A:
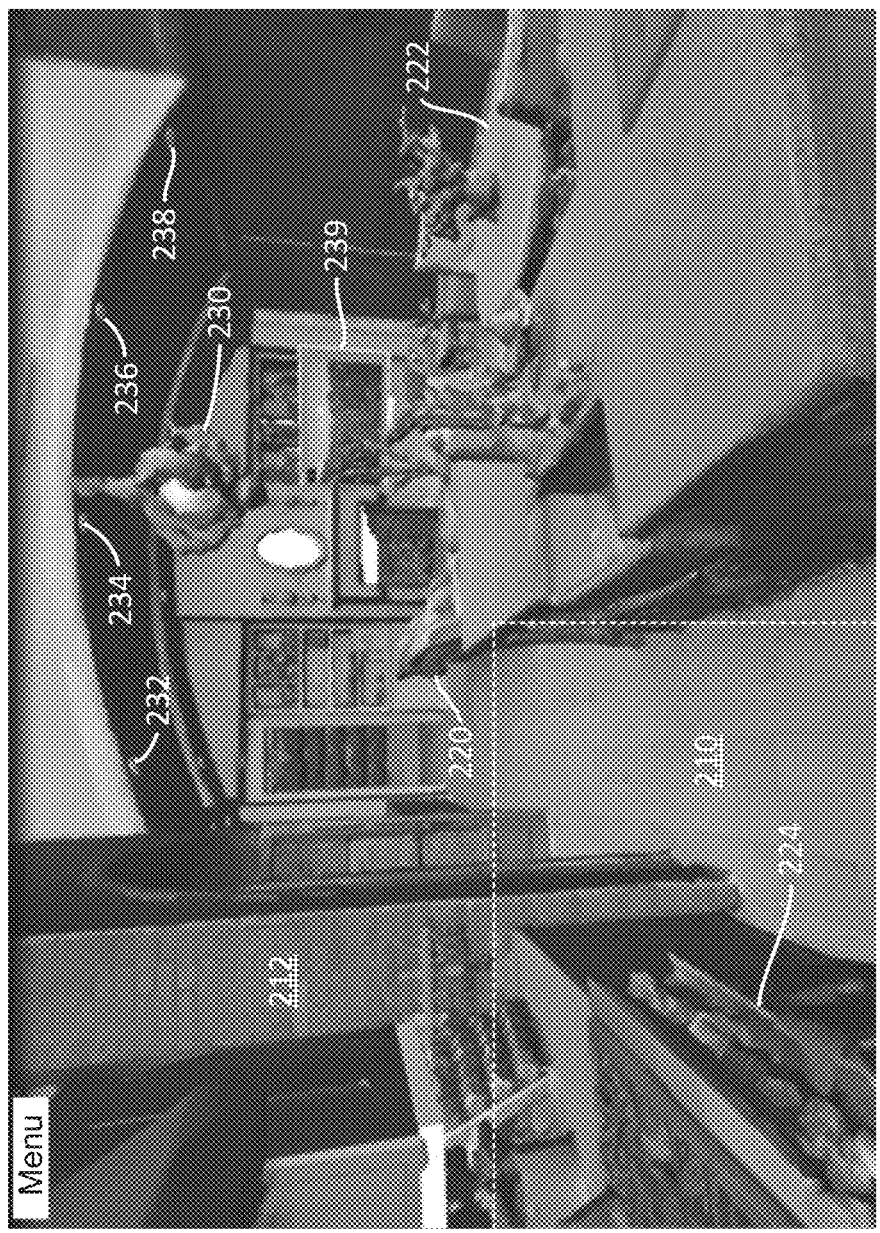
FIG. 2A is a screen shot of an example user-navigable 3-D virtual room that may be displayed by a control app.

FIG. 2A is a screen shot of an example user-navigable 3-D virtual room that may be displayed by the control app. The user-navigable 3-D virtual room includes substantially photo-realistic depictions of boundaries of the physical room, such as the floor 210 and walls 212, furnishings of the physical room such as a sofa 220, a table and chairs 222 and a stove 224, and devices in the physical room, such as a chandelier 230, recessed can light fixtures 232-238 and a television 239, that are under the control of the home automation system 100.

A user may navigate within the virtual room, using explicit navigation commands or implicit actions to move a virtual camera in 3-D space to view the virtual room from different perspectives. Explicit navigation commands may take different forms. In one implantation, explicit navigation commands may take the form of movement commands (e.g., touch gestures such as scrolls, swipes, etc. on the touch sensitive display screen, movement of a cursor, etc.). Navigation may include free movement, where the virtual camera is freely translated horizontally or vertically through 3-D space and freely rotated to different orientations in 3D space.

Figure 2B:
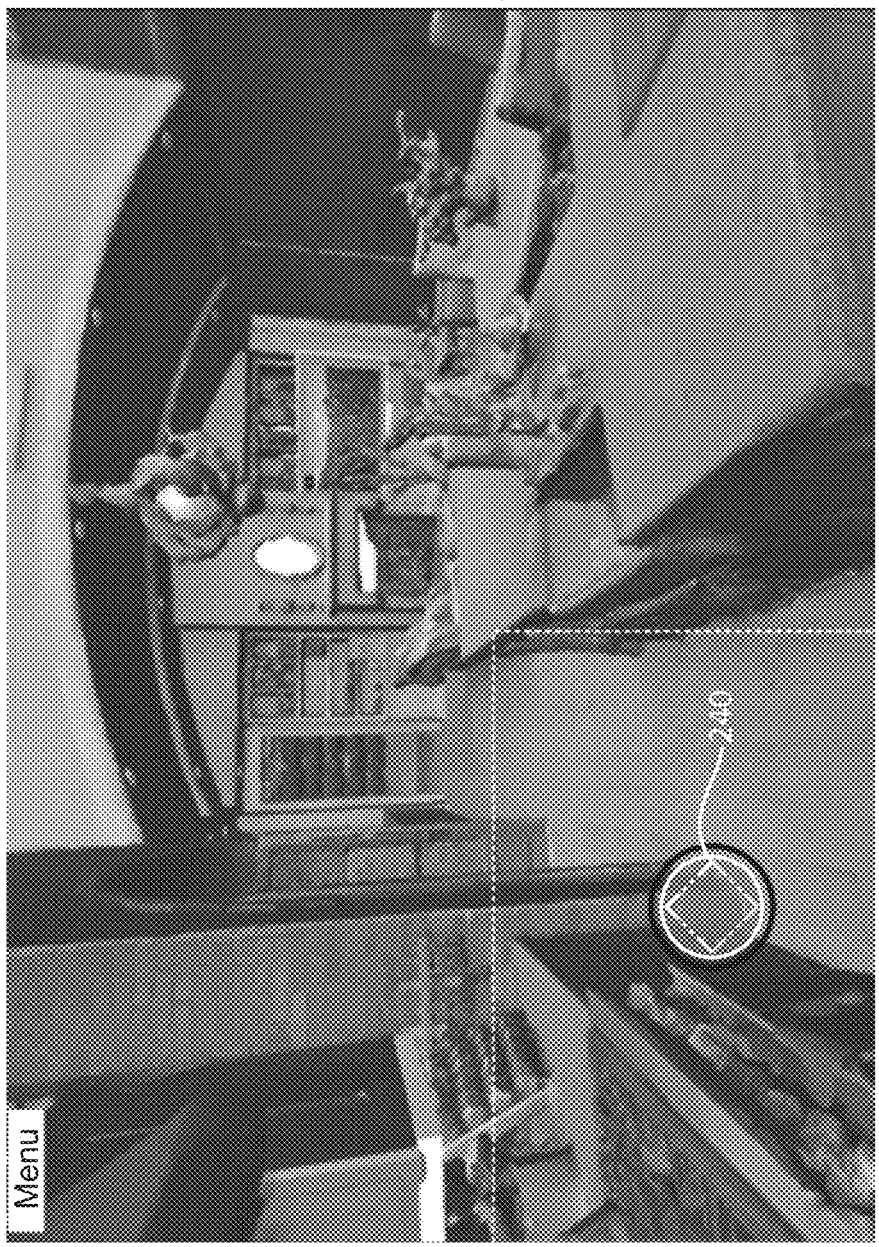
FIGS. 2B-2C are screen shots of the example user-navigable 3-D virtual room of FIG. 2A, illustrating free movement of a virtual camera in 3-D space to view the virtual room from different perspectives.
Figure 2C:
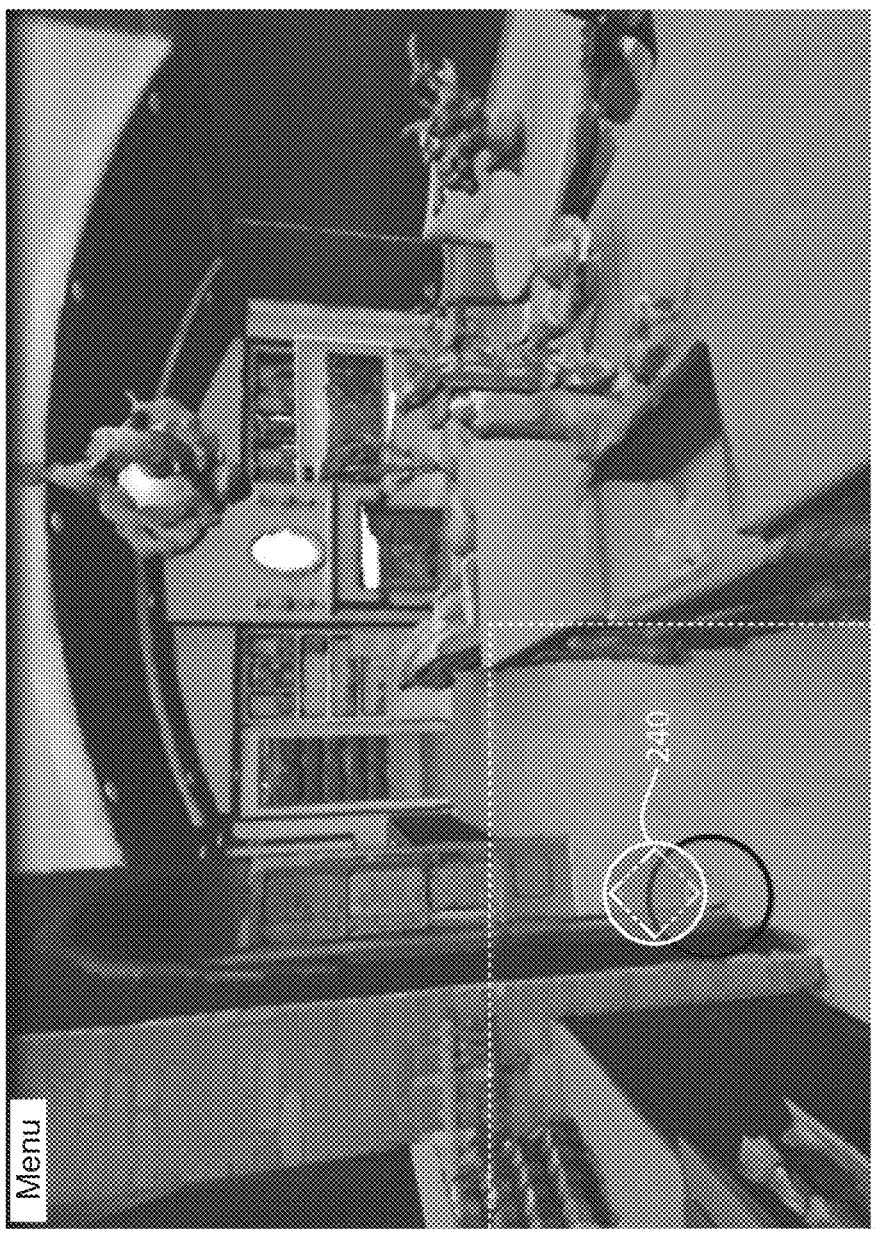

FIGS. 2B-2C are screen shots of the example user-navigable 3-D virtual room of FIG. 2A, illustrating free movement of a virtual camera in 3-D space to view the virtual room from different perspectives. A movement icon 240 may be displayed, which is displaced when a movement command (e.g., a scroll gesture, cursor movement, etc.) is received. In this example, the virtual camera is translated horizontally forward between FIG. 2B and FIG. 2C.

In another implementation, explicit navigation commands may take the form of node selections. A number of predefined nodes may be arranged at predetermined positions and represented as icons in the virtual room. In response to a user selection of a node (e.g., a touch on a node on a touch sensitive display screen, selection with a cursor, etc.), the node is selected and the virtual camera is moved (e.g., "snapped") to its position. Such movement may be shown in a "smooth" manner, with the virtual camera translating through space and the virtual room continuously updated to illustrate the movement. Each node may be associated with a predetermined starting orientation. Once at a node, the virtual camera may be freely rotated to different orientations in 3D space in response to navigation commands.

Figure 2D:
FIGS. 2D-2E are screen shots of the example user-navigable 3-D virtual room of FIG. 2A, illustrating movement of a virtual camera in 3-D space using navigation nodes to view the virtual room from different perspectives.
Figure 2E:
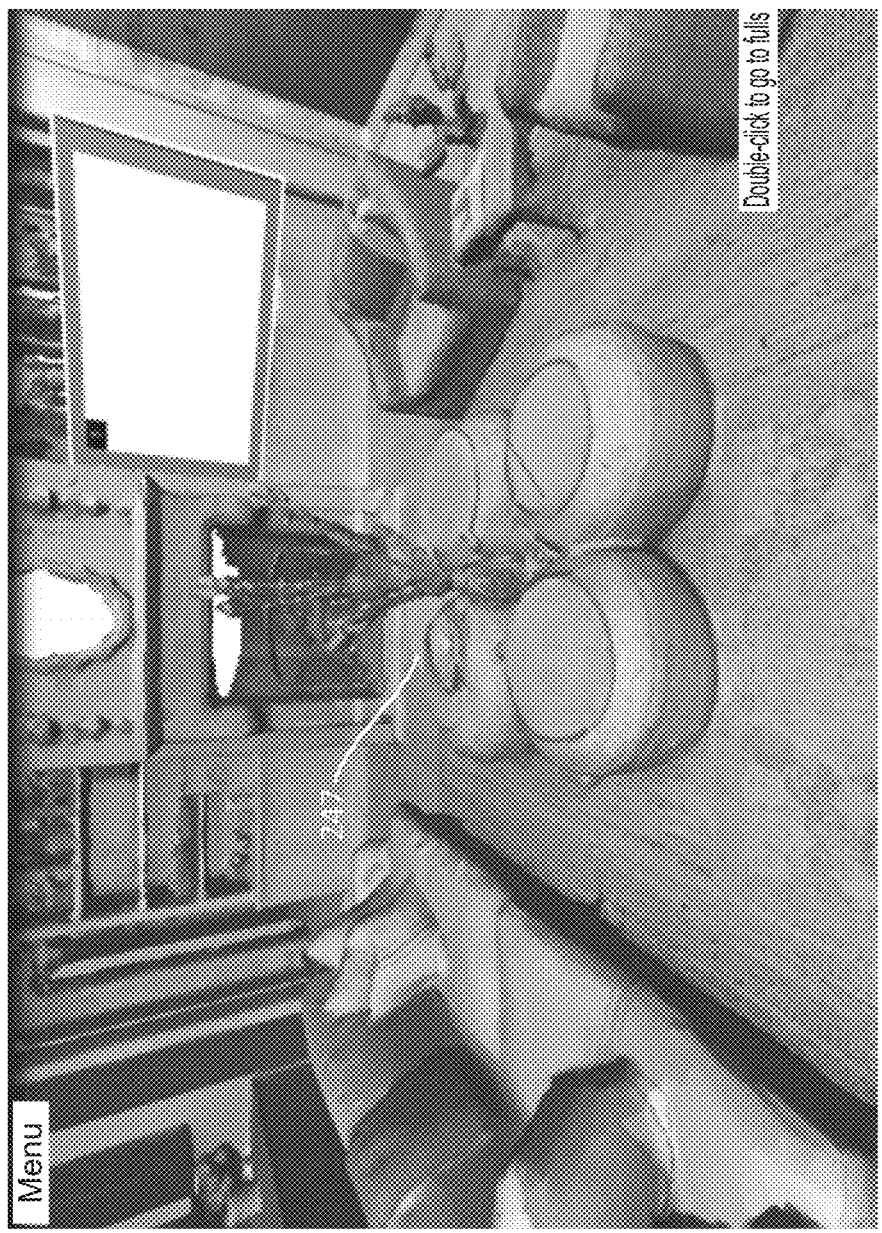

FIGS. 2D-2E are screen shots of the example user-navigable 3-D virtual room of FIG. 2A, illustrating movement of a virtual camera in 3-D space using navigation nodes to view the virtual room from different perspectives. A number of selection nodes 245, 247 are displayed, which may be selected (e.g., a touched, clicked on, etc.). In this example, selection node 245 is selected in FIG. 2D, which causes the virtual camera to be translated to the perspective shown FIG. 2C.

Implicit actions may also take a variety of forms. In one implementation, implicit actions may be based on position and orientation of the remote control 140, mobile device 160 or other electronic device 165 that is determined using the positioning beacons (e.g., and their Bluetooth, BLE, Wi-Fi, UWB, RFID or other signaling) and an orientation sensor. The user may freely translate the virtual camera by walking in the physical room holding the remote control 140, mobile device 160 or other electronic device 165. A user may freely rotate the virtual room by rotating the remote control 140, mobile device 160 or other electronic device 165. Where the electronic device is a HMD, the user head position and orientation may be directly translated to position and orientation in the virtual room.

By interacting with (e.g., touching, clicking on, etc.) the substantially photo-realistic depictions of the devices within the user-navigable 3-D virtual room, a user may indicate changes to the state of the corresponding devices in the physical room. The state change may cycle through available states of a device (e.g., between binary states, between a large number of possible states, etc.). When the state of devices is changed, a 3-D graphics engine (e.g., a Unity® or Unreal® graphics engine) of the control app dynamically updates the appearance of the user-navigable 3-D virtual room to reflect the changes, such that what a user views within the virtual room will mimic their experience within the corresponding physical room. The dynamic update may involve changing the appearance (e.g., illumination level, color, color temperature, media content, position or other visual properties) of the photo-realistic depictions of each device whose state is changed. The dynamic update may also involve changing the appearance (e.g., shadows and reflections) of the substantially photo-realistic depictions of boundaries, furnishings, and other devices that are not currently having their state changed, to depict the impact of the state change on these items. In this manner, the 3-D graphics engine mimics in the virtual room the experience the user will observe in the physical room when the states are changed.

Figure 2F:
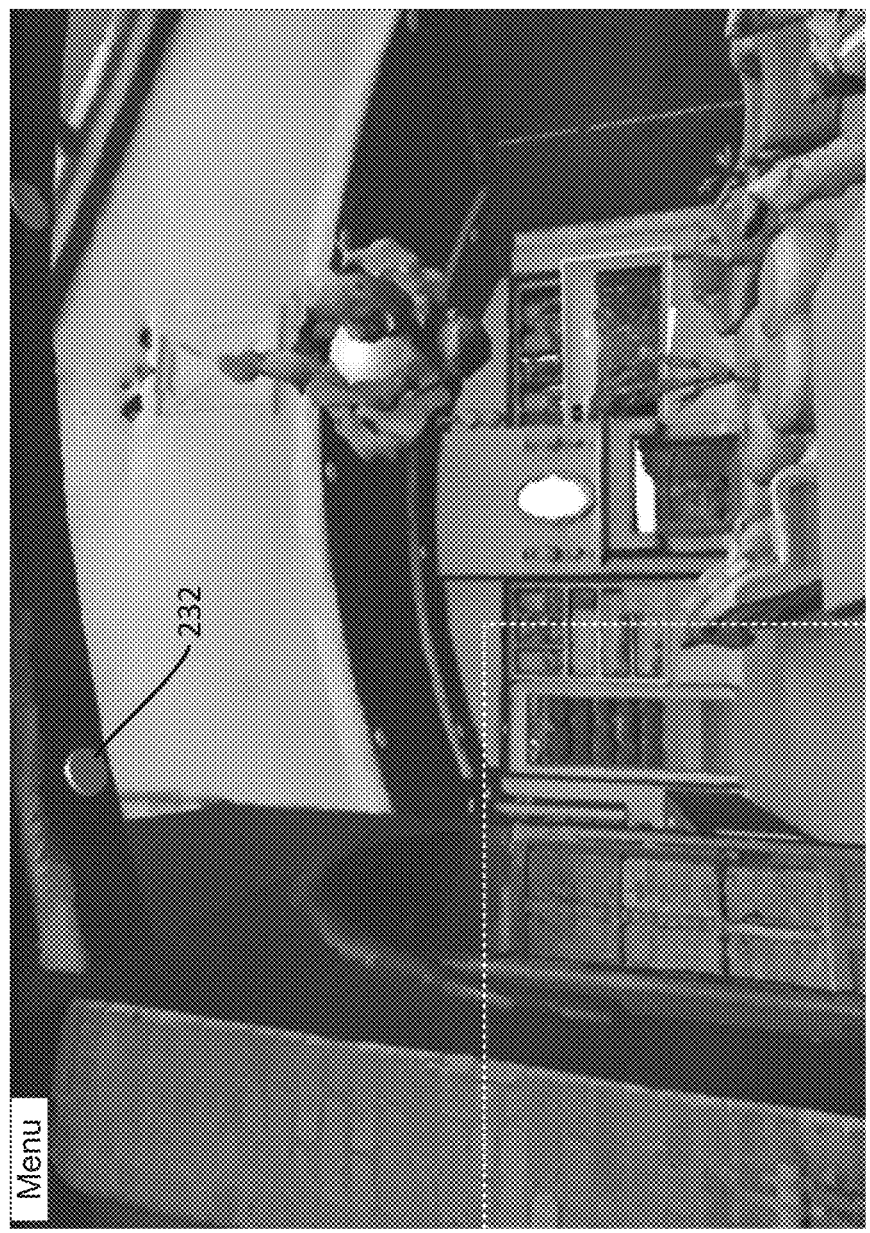
FIGS. 2F-2G are screen shots of the example user-navigable 3-D virtual room of FIG. 2A, illustrating changes to the illumination of lighting devices in response to user interaction with a depiction of the lighting device.
Figure 2G:
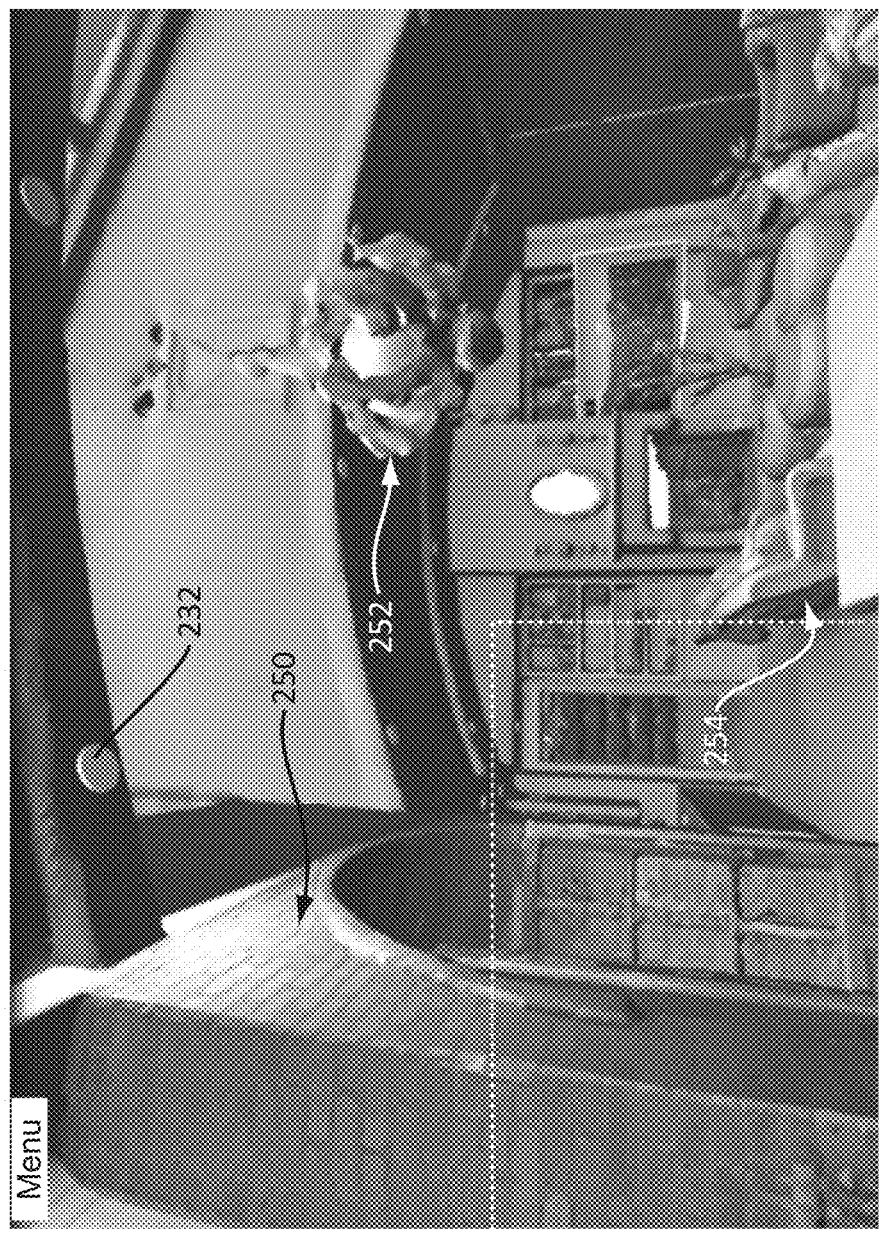

FIGS. 2F-2G are screen shots of the example user-navigable 3-D virtual room of FIG. 2A, illustrating changes to the illumination of lighting devices in response to user interaction with a substantially photo-realistic depiction of the lighting device. In FIG. 2F, the user interacts with (e.g., touches, clicks on, etc.) the depiction of a lighting device, specifically a recessed can light fixture 232. In response to such interaction, the control app causes the home automation system 100 to activate the recessed can light fixture 232 in the physical room. The graphics engine of the control app further dynamically updates the appearance of the depiction of the recessed can light fixture 232 in the virtual room so that it appears illuminated (e.g., imposing a virtual light source at its position) and dynamically updates the appearance of the depictions of boundaries (such as shadows and reflections 250 on the wall), of furnishings (such as shadows and reflections 254 on the sofa), and of other devices (such as shadows and reflections 252 on the chandelier) based on the change, as shown in FIG. 2G.

Figure 2H:
Figure 21:
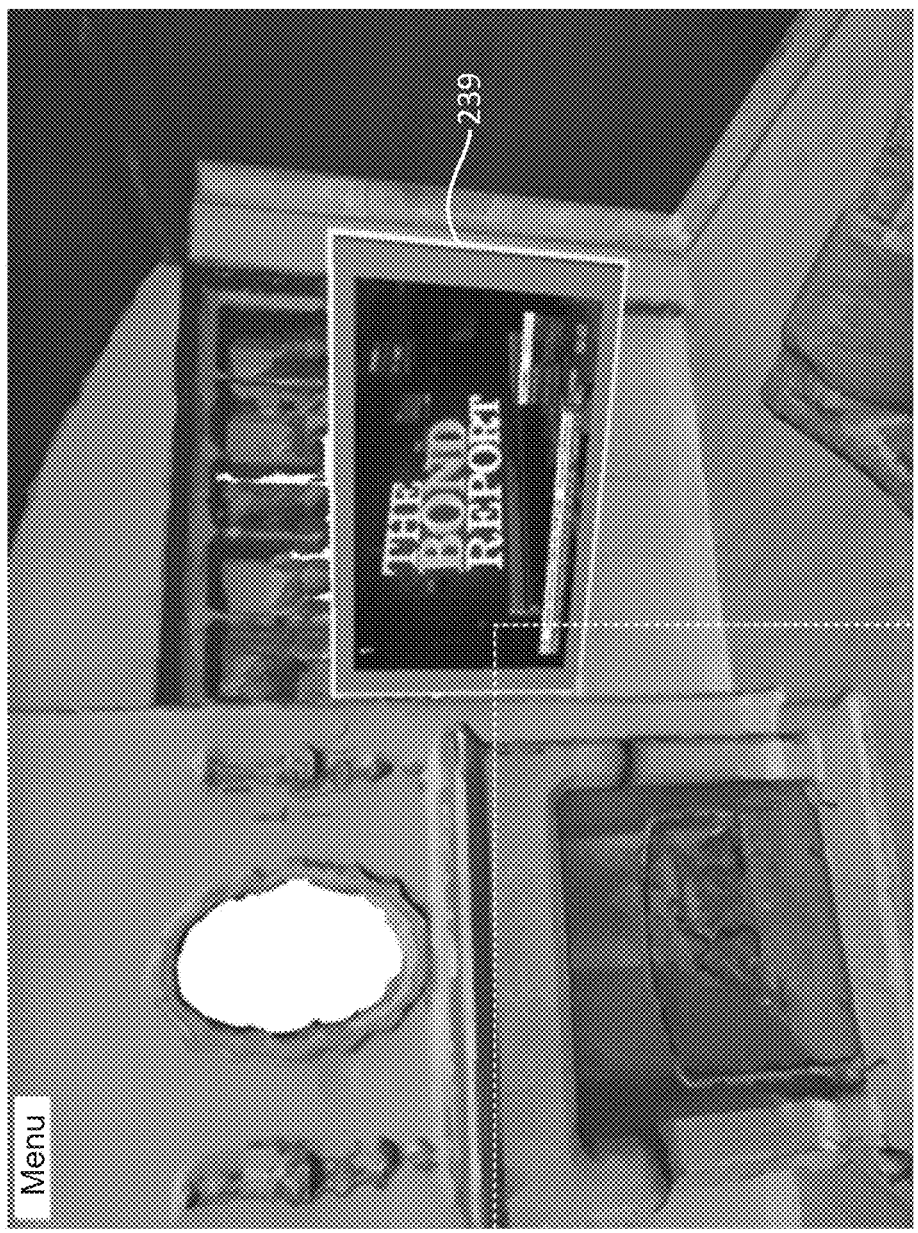

FIGS. 2H-2I are screen shots of the example user-navigable 3-D virtual room of FIG. 2A, illustrating changes to state of a display device in response to user interaction with a substantially photo-realistic depiction of the device. Here, the state is a media content state, namely a channel (e.g., a television channel). However, it should be understood that the media content state may take other forms, such as a source (e.g., signal from a DVD, a cable box, etc.), media file (e.g., movie file, TV show file, etc.), and the like. In FIG. 2H, the user interacts with (e.g., touches, clicks on, etc.) the depiction of the display device, specifically a television 239. In response to such interaction, the control app causes the home automation system 100 to change the channel of the television in the physical room, here from channel 6 to channel 1. Such change may involve cycling through a number of intermediary channels (e.g., in response to repeated touches, clicks, etc.). The graphics engine of the control app further dynamically updates the appearance of the depiction of the television 239 so that the actual media content of the channel is displayed within it in the user-navigable 3-D virtual room, as shown in FIG. 1.

In addition to changes to the illumination of lighting devices and changes to state of a display device, it should be remembered that a wide variety of other types of state changes may be made to other types of devices 112-124. For example, in response to user interaction with a substantially photo-realistic depiction of an electronic window blind, the control app may cause the home automation system 100 to activate the blind's motor to change blind position (e.g., to open or close the blind). The graphics engine of the control app further dynamically updates the appearance of the depiction of the electronic window blind in the virtual room so that it reflects the new blind position and dynamically updates the appearance of the depictions of boundaries, furnishings and other devices based on the change (e.g., changing shadow and reflections due to more or less natural light entering the room via the window).

Likewise, in response to user interaction with a substantially photo-realistic depiction of a gas fireplace, the control app may cause the home automation system 100 to signal an electronic ignition and gas supply system to regulate flame. The graphics engine of the control app further dynamically updates the appearance of the depiction of the gas fireplace in the virtual room so that it reflects the changed flame state, and of the boundaries, furnishings and other devices based on the changed flame state (e.g., changing shadow and reflections due to the amount of flame in the fireplace).

When there are large numbers of devices, it may be difficult to locate the substantially photo-realistic depiction of a desired device in the virtual room. Likewise, when there are large numbers of states for a device, cycling though states may be inefficient or impractical. In such cases, the user-navigable 3-D virtual room may be configured to display a menu in response to a user interacting with an interface element. The menu may list various devices that may be controlled, and states for the devices. A user may select (e.g., by touch, click, etc.) a desired device and state. The control app may cause the home automation system to make the desired state change, and the 3-D graphics engine may dynamically update the appearance of the user-navigable 3-D virtual room to reflect the changes, such that what a user views within the virtual room will mimic their experience within the corresponding physical room.

Figure 2J:
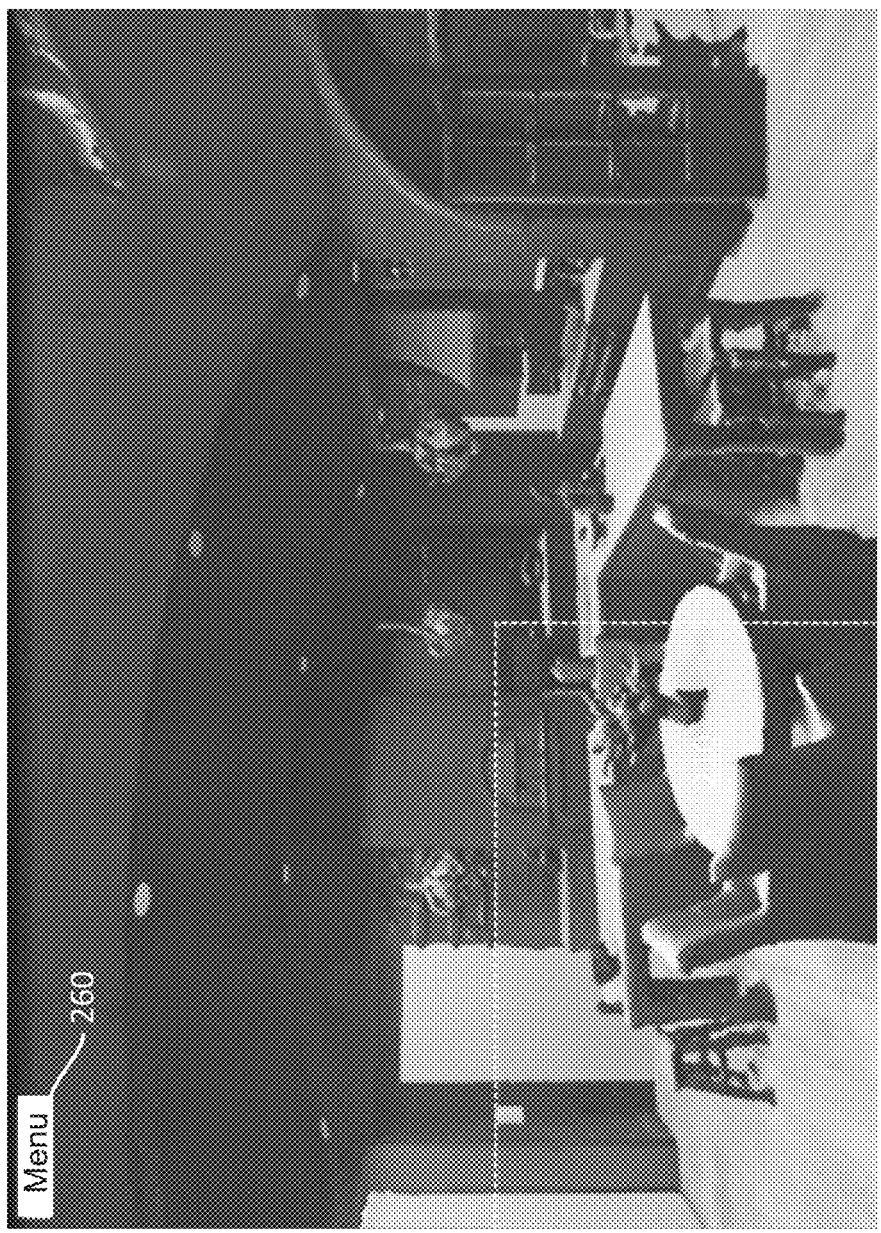
FIGS. 2J-2L are screen shots of the example user-navigable 3-D virtual room of FIG. 2A, illustrating changes to state of a lighting device in response to selections in a menu.
Figure 2K:
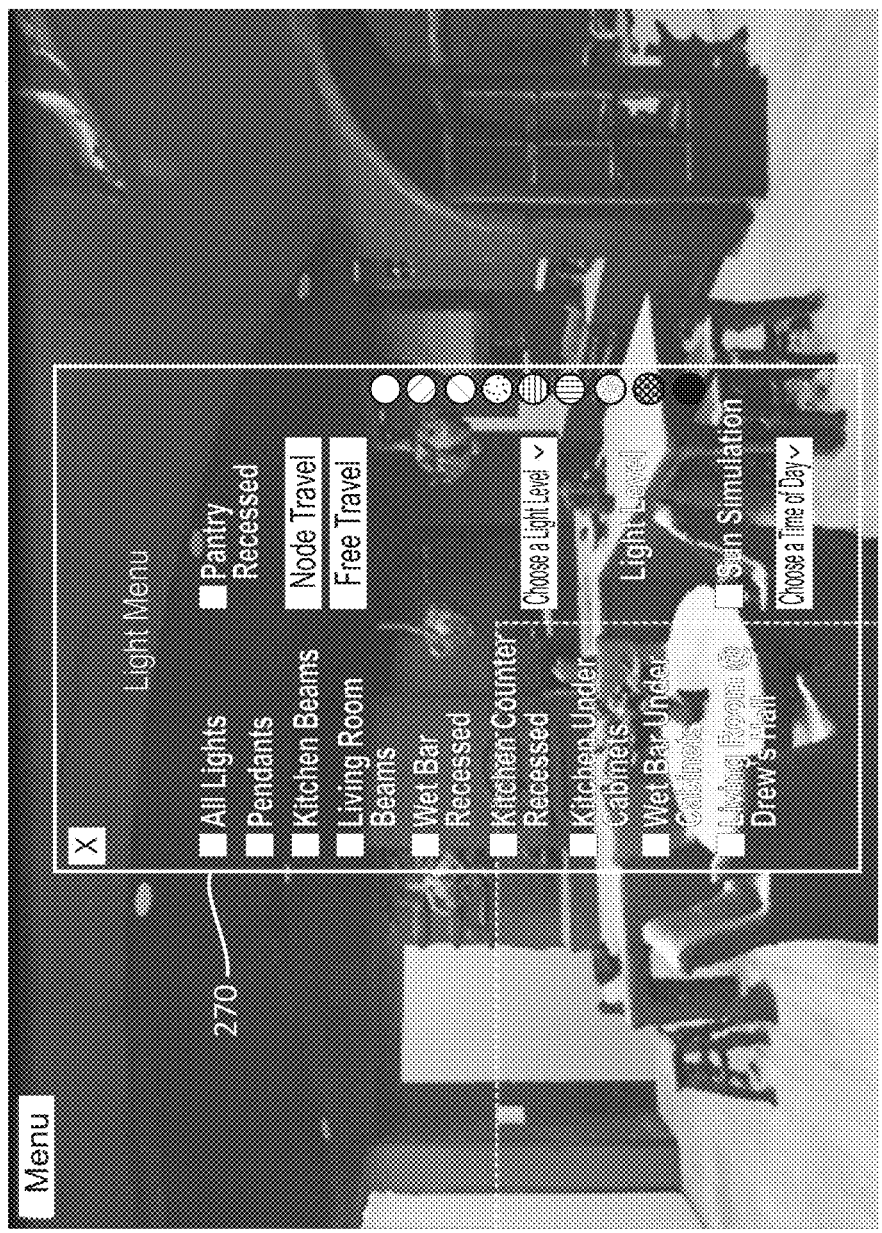
Figure 2L:
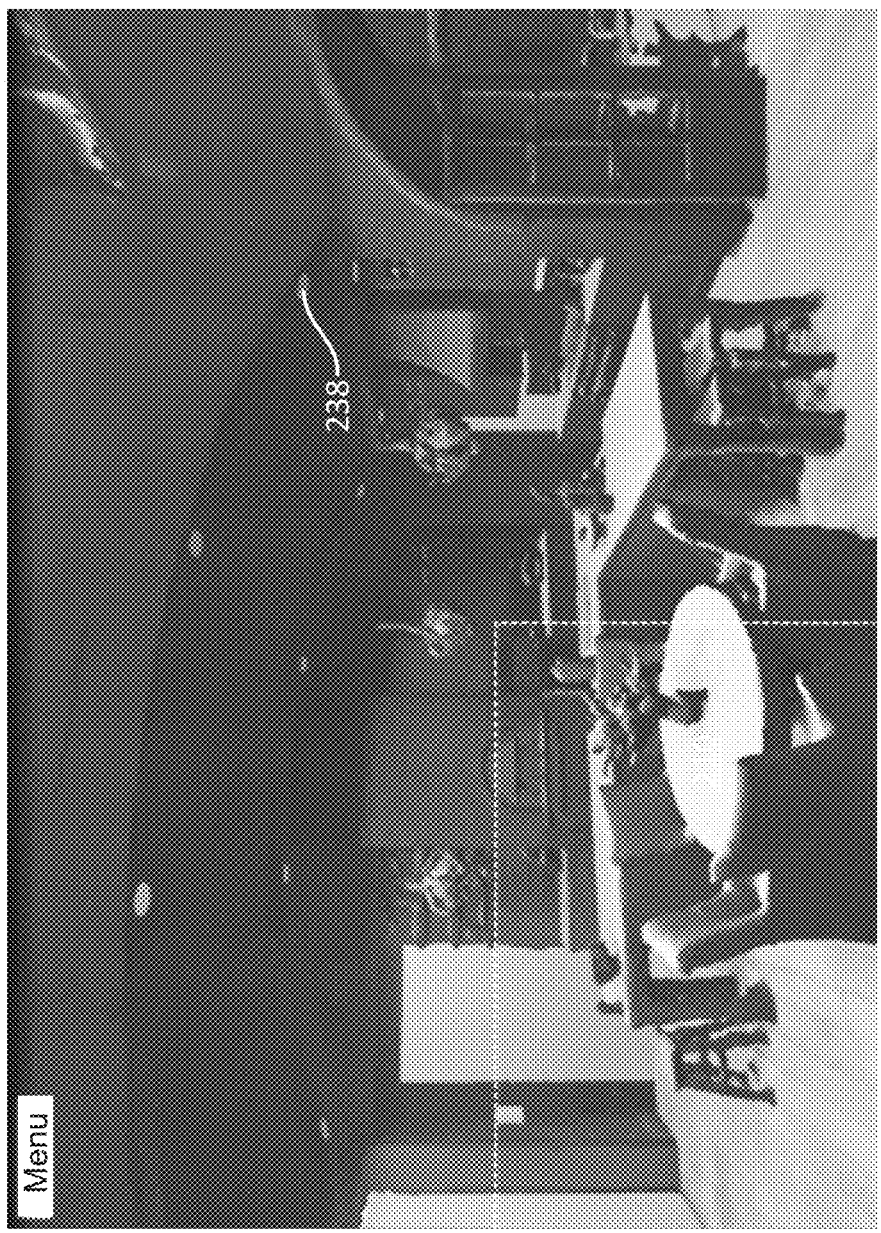
Figure 2M:
FIG. 2M is a screen shot of an example user-navigable 3-D virtual room at higher resolution and without visual artifacts, which may more closely approximate a commercial implementation.

FIGS. 2J-2L are screen shots of the example user-navigable 3-D virtual room of FIG. 2A, illustrating changes to state of a lighting device in response to selections in a menu. In FIG. 2J the user interacts with (e.g., touches, clicks on, etc.) a menu interface element 260. In response to such interaction, the control app causes a menu 270 to be displayed, for example overlaid on the virtual room, as shown in FIG. 2K. In this example, the menu 270 includes lighting devices in the physical rooms and possible states of such devices, such as illumination level, color, color temperature, etc. A user selects a lighting device, in this example, a recessed can light fixture 238, and an illumination level and color. The control app then causes the home automation system to illuminate the recessed can light fixture 238 to the desired level in the desired color. A large number of different colors may be supported (e.g., 32 bit color). The graphics engine of the control app further dynamically updates the appearance of the depiction of the recessed can light fixture 238, so that it appears illuminated to the desired level in the desired color (e.g., imposing a virtual light source at its position), and dynamically updates the appearance of (e.g., shadows and reflection on) depictions of boundaries, furnishings, and on other devices in the room, as shown in FIG. 2L. When there are a large number of supported colors (e.g., 32 bit color), the ability to see what the room will look like by observing the virtual room with different colors may greatly simplify control.

FIG. 2M is a screen shot of an example user-navigable 3-D virtual room at higher resolution and without visual artifacts, which may more closely approximate a commercial implementation. As can be seen, the depictions of controlled devices (such as a television 239), boundaries (such as the walls), of furnishings (such as the sofa), and of other devices, appear substantially photo-realistic. It should be understood that the virtual rooms shown in FIGS. 2A-2L may appear in this manner.

Figure 3:
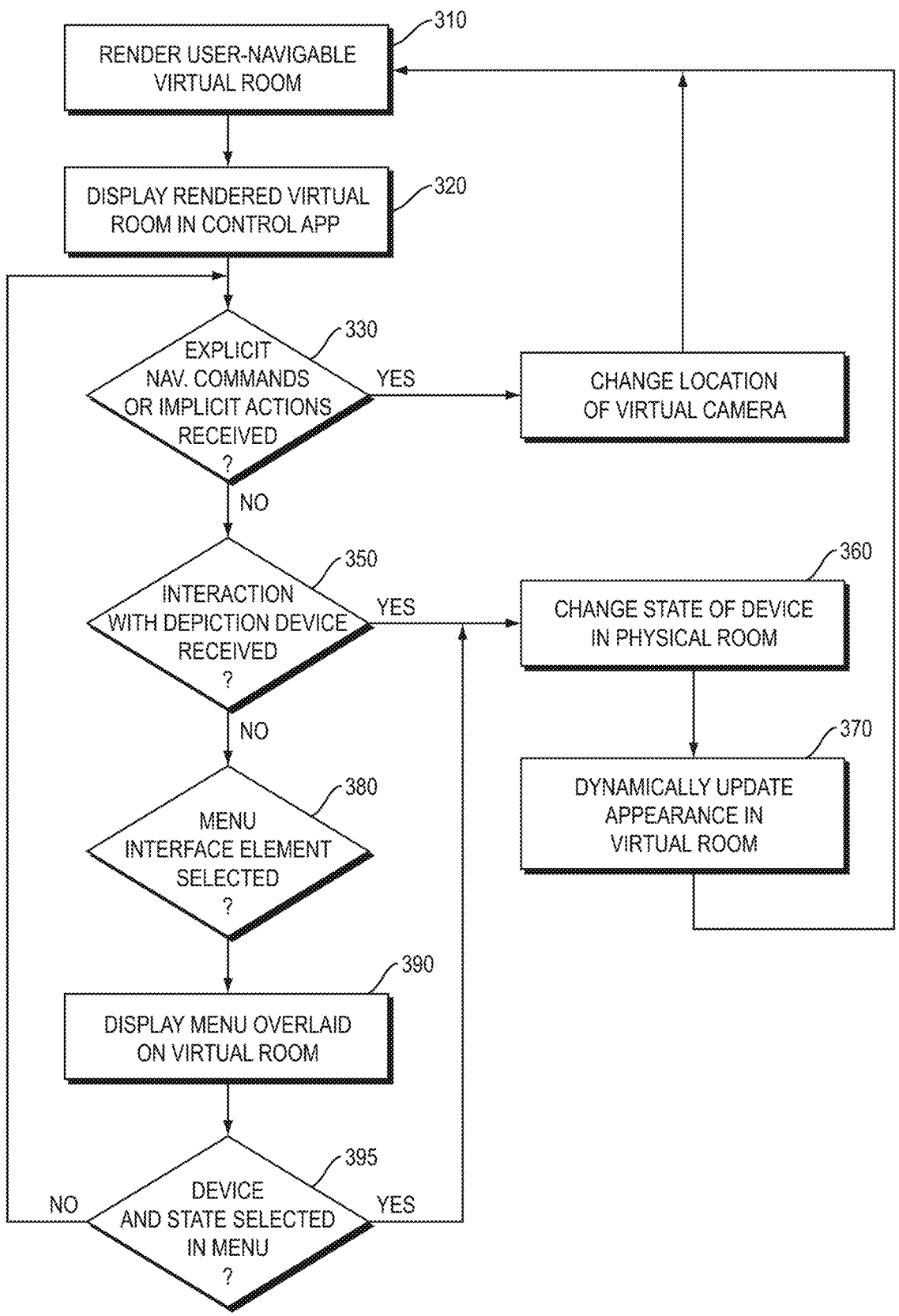
FIG. 3 is a flow diagram of an example sequence of steps for operating a user-navigable 3-D virtual room-based user interface to control devices of a home automation system.

FIG. 3 is a flow diagram of an example sequence of steps for operating a user-navigable 3-D virtual room-based user interface to control devices 112-124 of a home automation system 100. The steps in FIG. 3 summarize operations discussed in more detail above. At step 310, the control app on the remote control 140, mobile device 160 or other electronic device 165 uses a graphics engine to render a user-navigable 3-D virtual room from a first perspective as defined by a virtual camera. The user-navigable 3-D virtual room may include substantially photo-realistic depictions of boundaries of the physical room (e.g., walls, the ceiling, the floor, etc.), furnishings present in the physical room (e.g., sofas, chairs, beds, wall-hangings, etc.), and devices present in the physical room (e.g., lighting devices, display devices, electronic window blinds, HVAC devices and/or other types of devices) that are under the control of the home automation system 100. At step 320, the control app displays the rendered user-navigable 3-D virtual room in the control app on a display screen (e.g., a touch sensitive display screen) of the remote control 140, the mobile device 160 or other electronic device 165.

At step 330, the control app determines whether any explicit navigation commands (e.g., movement commands or node selections) or implicit actions (e.g., a change to position or orientation of the remote control 140, the mobile device 160 or other electronic device 165) are received. If so, at step 340, the control app changes perspective in response thereto by altering the position and/or orientation of the virtual camera, and execution loops back to step 310, where the graphics engine re-renders the virtual room from this new perspective. If not, execution proceeds to step 350, where the control app determines whether the user has interacted with (e.g., touched, clicked on, etc.) the substantially photo-realistic depiction of a device within the user-navigable 3-D virtual room. If so, at step 360, the control app causes the home automation system 100 to change a state of the device in the physical room. Further, at step 370, the control app dynamically updates the appearance (e.g., illumination level, color, color temperature, media, media content, position or other visual properties) of the substantially photo-realistic depiction of the device as well as the appearance (e.g., shadows and reflections) of the substantially photo-realistic depictions of boundaries, furnishings, and other devices in the virtual room. Execution then loops back to step 310, where the graphics engine of the control app re-renders the virtual room with these new appearances.

If not, execution proceeds to step 380, where the control app determines whether the user has interacted with (e.g., touched, clicked on, etc.) a menu interface element. If so, at step 390, a menu is displayed overlaid upon the user-navigable 3-D virtual room. At step 395, the control app determines if a device and state have been selected in the menu. If so, execution loops to step 360, where the control app causes the home automation system 100 to change a state of the device in the physical room. Then, at step 370, the control app dynamically updates the appearance of the substantially photo-realistic depiction of the selected device based on the selected state, as well as the appearance of the substantially photo-realistic depictions of boundaries, furnishings, and other devices in the virtual room. Execution then loops back to step 310, where the graphics engine of the control app re-renders the virtual room from these new appearances. If not, the control app waits for further user input and execution loops back to step 330.

Generation of a User-Navigable 3-D Virtual Room-Based User Interface

Figure 4:
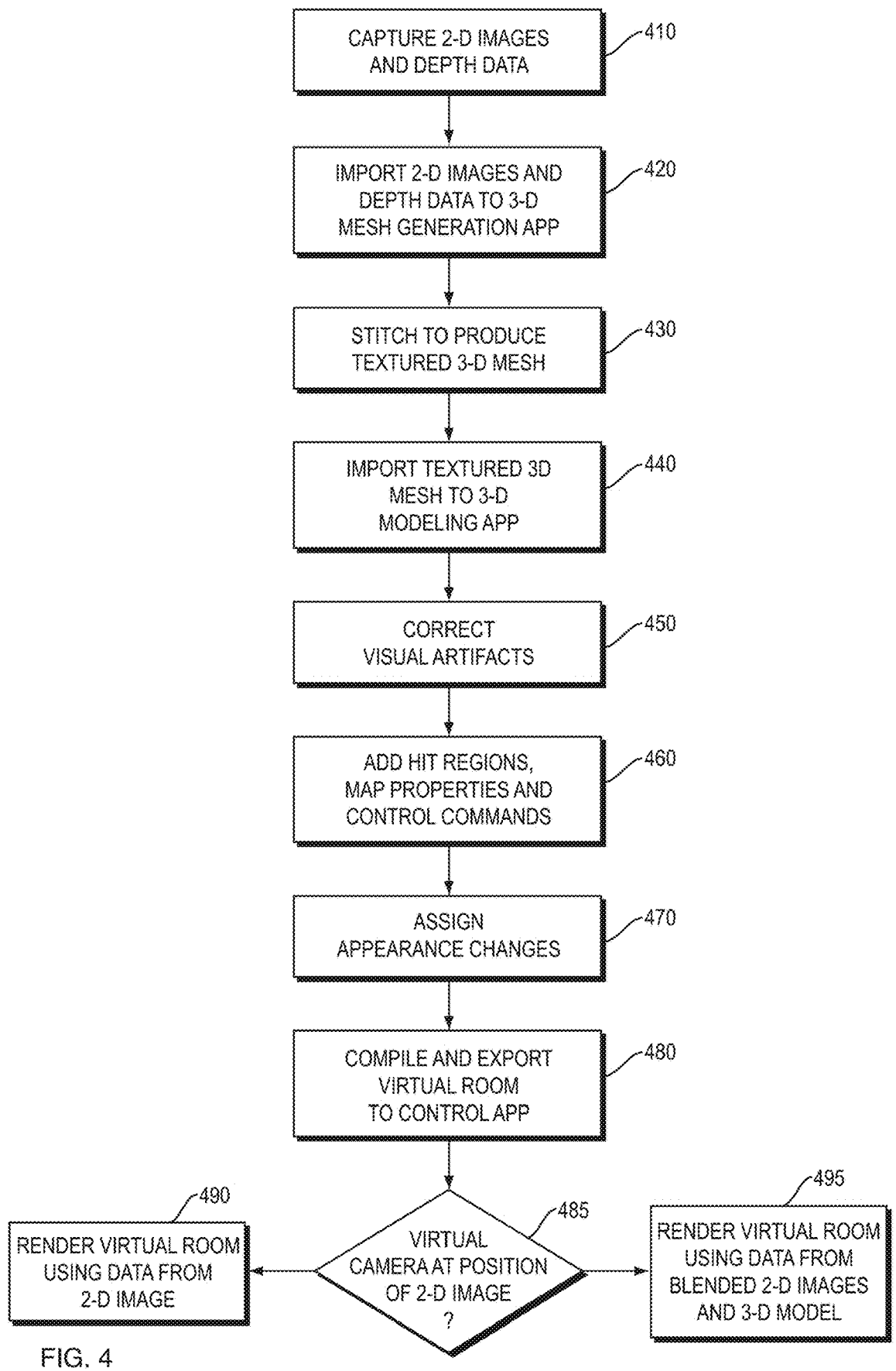
FIG. 4 is a flow diagram of an example sequence of steps for generating a user-navigable 3-D virtual room-based user interface to control devices of a home automation system.

The 3-D virtual room-based user interface is typically generated with a combination of data collection and configuration operations performed by configuration applications executing on local computing devices and/or in the cloud and rendering operations performed by a graphics engine of a control app executing on the remote control 140, the mobile device 160 or other electronic device 165. FIG. 4 is a flow diagram of an example sequence of steps for generating a user-navigable 3-D virtual room-based user interface to control devices 112-124 of a home automation system. Steps 410-480 represent data collection and configuration operations while steps 485-495 represent rendering operations.

At step 410, an installer places a 3-D camera at a plurality of positions in the physical room, and captures a plurality of overlapping sets of 2-D images (e.g., 2-D panoramic images) and a 3-D space model (e.g., 3-D mesh). The 3-D camera may use any of a variety of imaging and scanning technologies, such as single-point laser scanning, line profile laser scanning, structured light (non-laser) detection, stereo-vision, etc. to produce the 3-D space models. Preferably, at the time of capture, the devices are all in a deactivated or "off" state to simplify later generation of appearance effects.

At step 420, the 2-D images (e.g., 2-D panoramic images) and 3-D space model (e.g., 3-D mesh) is imported from the 3-D camera to a stitching application, which may be executed in the cloud or on a local computing device. In one implementation, the stitching application may be the Matterport® cloud-based software package. At step 430, the installer utilizes the stitching application to stitch the 2-D images (e.g., 2-D panoramic images) and 3-D space model (e.g., 3-D mesh) together, to link (i.e. stitch) image data to corresponding locations in the 3-D space model.

At step 440, the stitched 2-D images and 3-D space model are imported into a 3-D modeling application, which may be executed in the cloud or on a local computing device. In one implementation, the 3-D modeling application may be a Unity® or Unreal® 3D development platform. At step 450, the installer utilizes the 3-D modeling application to correct visual artifacts. Visual artifacts may be caused by a variety of factors in the capture and stitching processes. For example, reflective surfaces, such as display screens or window panes typically do not capture well, and may introduce visual artifacts that require correction. At step 460, the installer utilizes the 3-D modeling application to tag depictions of devices with hit regions (i.e., 3-D hit boxes), and maps these hit regions to properties of devices and control commands of the home automation system 100 for changing state of the devices. For example, a lighting device may be marked with a hit region that surrounds its outer extent, and mapped to lighting properties of a lighting load that is controlled by certain lighting control commands (e.g., to change illumination level, color, color temperature, etc.). Likewise, a display device may be marked with a hit region that surrounds its screen, and mapped to display properties of a display device that is controlled by certain control commands that affect media content states (e.g., channel, source, file, etc.). Similarly, an electronic window blind may be marked with a hit region that surrounds its outer extent, and mapped to movement properties of an electronic window blind that is controlled by certain position control commands.

At step 470, the installer utilizes the 3-D modeling application to assign appearance changes to the depictions of devices that coincide with their properties and control commands. The assigned appearance changes define how the graphics engine of the control app should update the depictions of the devices to coincide with changes that occur in the physical room when the control commands are issued, and how the appearance changes should affect the appearance of the boundaries, furnishings, and other devices in the room. The assigned appearance changes may have a type and bounds based on the device properties. At step 480, the artifact-corrected, tagged, appearance assigned, stitched 2-D images and 3-D space models (now referred to as a virtual room) is exported to the control app for inclusion in a user-navigable 3-D virtual room-based user interface.

The virtual room is rendered by the graphics engine of the control app. At step 485, the control app determines whether a virtual camera indicating the user's desired perspective is at a position that corresponds with the position from which one of the of 2-D images (e.g., 2-D panoramic images) was captured. If so, at step 485, the graphics engine of the control app renders the virtual room by using data from the 2-D image (e.g., 2-D panoramic image) captured from that location. If not, at step 495 the graphics engine of the control app blends (e.g., changes alpha channel and render layers) of available 2-D images (e.g., 2-D panoramic images) according to the 3-D space model (e.g., 3-D mesh), and uses the blended data to render the virtual room.

In summary, a user-navigable, 3-D virtual room-based user interface for controlling devices of a home automation system is provided. While the above description uses certain specific examples, it should be apparent that a number of modifications and/or additions may be made thereto. For example, while it is discussed above that each of the remote control 140, the mobile device 160 or other electronic device 165 may have a touch sensitive display screen and that user input in the user-navigable, 3-D virtual room-based user interface may be made with gestures and touches, it should be understood that the interface may be adapted for non-touch sensitive displays, and that user input may be received via a pointing device and cursor (e.g., with a selection made by clicking on an item) or other type of input device.

Likewise, while it is described above that the user-navigable, 3-D virtual room-based user interface may be used to control a configured home automation system 100 in a structure, the user-navigable, 3-D virtual room-based user interface may be adapted for use in previewing or preconfiguring a home automation system, in a sales or setup role. For example, a user may be shown effects than may be produced in a structure using a user-navigable, 3-D virtual room prior to purchase. Alternatively, a user may be shown possible effects that can be produced, during a pre-configuration process when the system is first installed or setup. In such cases, the effects may not be actually produced in the physical room at the time of the display.

Further, while it is discussed above that the user-navigable 3-D virtual room mimics the appearance of a physical room, and various types of visual appearances are discussed, it should be understood that appearance may also include non-visual aspects of the experience in the physical room, such as sound. In such case, the control app may play on a speaker of the remote control 140, mobile device 160, and other electronic device 165 audio being played in the physical room and/or sound effects mimicking ambient sounds in the physical room. For example, when a user activates the television 239 and changes it to a channel, the actual audio of the channel may be played by the speaker of the remote control 140, mobile device 160, and other electronic device 165 accompanying the visual display of the user-navigable 3-D virtual room. Likewise, when a user changes position of an electronic window blind, a sound effect mimicking a blind rising or lowering may be played by the speaker of the remote control 140, mobile device 160, and other electronic device 165 accompanying the visual display of the user-navigable 3-D virtual room.

Still further, while it is discussed above that a state of a device in the physical room may be changed in response to a user interaction with a substantially photo-realistic depiction of the device, such as the user touching, clicking on, etc. the depiction of the device in the user-navigable 3-D virtual room, in it should be understood that some changes in state may be configured to trigger at predefined times or in response to predetermined conditions being met. In one embodiment, the user may interact with the system to configure illumination level, color and/or color temperature and or other states of lighting devices to be dynamically changed throughout the day to provide circadian lighting. Such change of states may at least be partially based on an outdoor sensor that captures current lighting data for an outdoor environment. The appearance of the depictions of the lighting devices, boundaries, and the furnishing in the user-navigable 3-D virtual room are updated to reflect the changed states implemented by circadian lighting. Further details of circadian lighting techniques that may be used in combination with the techniques may be found in U.S. patent application Ser. No. 17/018,556, titled "Circadian Lighting in a Diverse Home Automation System", by Andrew R. Hamm et al., filed on Sep. 11, 2020, the contents of which are incorporated by reference herein in their entirety.

Finally, it should be understood that the steps described above may be implemented in hardware, software (embodied as a non-transitory electronic device-readable media including software), firmware, or a combination thereof. A non-transitory electronic device-readable media may take the form of a memory, such as a Random Access Memory (RAM), a disk, such as a hard drive or flash device, or other tangible storage media. In general, it should be understood that the above descriptions are meant to be taken only by way of example.

The invention claimed is:

1. A method for controlling a home automation system using a user-navigable three-dimensional (3-D) virtual room that corresponds to a physical room, comprising:
    rendering and displaying, by a control application (app) executing on an electronic device, the user-navigable 3-D virtual room from a perspective defined by a virtual camera, wherein the control app renders the user-navigable 3-D virtual room based on data from at least one of a plurality of two-dimensional (2-D) images of the physical room captured from different respective positions in the physical room, and the user-navigable 3-D virtual room includes depictions of one or more devices present in the physical room that are under the control of the home automation system, depictions of one or more boundaries of the physical room and depictions of one or more furnishings present in the physical room;
    receiving an explicit navigation command or implicit action from a user;
    in response to the explicit navigation command or implicit action, translating or rotating the virtual camera, by the control app, to alter a position or an orientation of the virtual camera;
    re-rendering and displaying, by the control app, the user-navigable 3-D virtual room from a new perspective defined by the altered position or orientation, wherein the new perspective does not coincide with the position in the physical room from which any of the 2-D images were captured, and the control app re-renders the user-navigable 3-D virtual room by blending data from multiple 2-D images captured from different positions to show the user-navigable 3-D virtual room from the new perspective;
    receiving a user interaction associated with the user-navigable 3-D virtual room; and
    in response to the user interaction, causing the home automation system to change a state of a device in the physical room.

2. The method of claim 1, further comprising:
    dynamically updating, by the control app, an appearance of the depiction of the device, the depictions of one or more boundaries, or the depictions of one or more furnishings in the user-navigable 3-D virtual room to reflect the changed state.

3. The method of claim 1, wherein the receiving an explicit navigation command or implicit action is receiving an explicit navigation command, and the explicit navigation command includes a touch gesture on a touch sensitive display screen or a movement of a cursor by the user.

4. The method of claim 1, wherein the receiving an explicit navigation command or implicit action is receiving an implicit action, and the implicit action includes a change in position or orientation of the electronic device by the user.

5. The method of claim 1, wherein the user interaction is an interaction with a depiction of the device within the user-navigable 3-D virtual room by the user.

6. The method of claim 1, further comprising:
    displaying, by the control app, a menu, and
    wherein the user interaction is an interaction with a menu interface element of the menu by the user.

7. The method of claim 1, wherein the device is a lighting device and the state of the device includes at least one of an illumination level, color, or color temperature.

8. The method of claim 7, further comprising:
    dynamically updating, by the control app, an appearance of the depiction of the lighting device to show the lighting device with changed illumination level, color, or color temperature, the depictions of one or more boundaries to show the one or more boundaries with changed shadows or reflections resulting from the changed illumination level, color, or color temperature, or the depictions of one or more furnishings to show the one or more furnishings with changed shadows or reflections resulting from the changed illumination level, color, or color temperature.

9. The method of claim 1, wherein the device is an electronic window blind and the state of the device includes a blind position.

10. The method of claim 9, further comprising:
    dynamically updating, by the control app, an appearance of the depiction of the electronic window blind to show the electronic window blind with changed blind position, the depictions of one or more boundaries to show the one or more boundaries with changed shadows or reflections resulting from the changed blind position, or the depictions of one or more furnishings to show the one or more furnishings with shadows or reflections resulting from the changed blind position.

11. The method of claim 1, wherein the depictions of one or more devices, depictions of one or more boundaries and depictions of one or more furnishings are each substantially photo-realistic depictions.

12. A non-transitory electronic device readable medium having software encoded thereon, the software, when executed on one or more processors of one or more electronic devices, operable to:
    render and display a user-navigable three-dimensional (3-D) virtual room from a perspective defined by a virtual camera based on data from at least one of a plurality of two-dimensional (2-D) images of a physical room captured from different respective positions and orientations in the physical room, wherein the user-navigable 3-D virtual room includes depictions of one or more devices present in the physical room,
    receive an explicit navigation command or implicit action from a user;
    in response to the explicit navigation command or implicit action, translate or rotate the virtual camera to alter a position or an orientation of the virtual camera;
    re-render and display the user-navigable 3-D virtual room from a new perspective defined by the altered position or orientation of the virtual camera, wherein the new perspective does not coincide with the position or orientation in the physical room from which any of the 2-D images were captured, and the user-navigable 3-D virtual room is re-rendered by blending data from multiple 2-D images captured from different positions or orientations to show the user-navigable 3-D virtual room from the new perspective;

receive a user interaction associated with the user-navigable 3-D virtual room;

in response to the user interaction, change a state of a device in the physical room.

13. The non-transitory electronic device readable medium of claim 12, wherein the software when executed is further operable to:

dynamically update an appearance of the depiction of the device in the user-navigable 3-D virtual room to reflect the changed state.

14. The non-transitory electronic device readable medium of claim 12, wherein the user-navigable 3-D virtual room further includes depictions of one or more boundaries of the physical room or depictions of one or more furnishings present in the physical room.

15. The non-transitory electronic device readable medium of claim 12, wherein the device is a lighting device and the state of the device includes at least one of an illumination level, color or color temperature.

16. The non-transitory electronic device readable medium of claim 12, wherein the device is an electronic window blind and the state of the device includes a blind position.

17. The non-transitory electronic device readable medium of claim 12, wherein the device is a display device and the state of the device includes a media content state.

18. A method for controlling a home automation system using a user-navigable three-dimensional (3-D) virtual room that corresponds to a physical room, comprising:

rendering and displaying, by a control application (app) executing on an electronic device, the user-navigable 3-D virtual room from a perspective defined by a virtual camera, wherein the control app renders the user-navigable 3-D virtual room based on data from a plurality of images of the physical room captured from different respective positions in the physical room;

receiving an explicit navigation command or implicit action from a user;

in response to the explicit navigation command or implicit action, translating or rotating the virtual camera, by the control app, to alter a position or an orientation of the virtual camera;

re-rendering and displaying, by the control app, the user-navigable 3-D virtual room from a new perspective defined by the altered position or orientation, wherein the new perspective does not coincide with the position in the physical room from which any of the images were captured;

receiving a user interaction associated with the user-navigable 3-D virtual room; and in response to the user interaction, causing the home automation system to change a state of a device in the physical room.

19. The method of claim 18, further comprising:

dynamically updating, by the control app, an appearance of the user-navigable 3-D virtual room to reflect the changed state.

20. The method of claim 18, wherein the receiving an explicit navigation command or implicit action is receiving an explicit navigation command, and the explicit navigation command includes a touch gesture on a touch sensitive display screen or a movement of a cursor by the user.

21. The method of claim 18, wherein the receiving an explicit navigation command or implicit action is receiving an implicit action, and the implicit action includes a change in position or orientation of the electronic device by the user.

22. The method of claim 18, wherein the user interaction is an interaction with a depiction of the device within the user-navigable 3-D virtual room by the user.

23. The method of claim 18, further comprising:

displaying, by the control app, a menu, and wherein the user interaction is an interaction with a menu interface element of the menu by the user.

24. The method of claim 18, wherein the device is a lighting device and the state of the device includes at least one of an illumination level, color, or color temperature.

25. The method of claim 18, wherein the user-navigable 3-D virtual room includes depictions of one or more devices present in the physical room that are under the control of the home automation system, depictions of one or more boundaries of the physical room and depictions of one or more furnishings present in the physical room, and the depictions of one or more devices, depictions of one or more boundaries and depictions of one or more furnishings are each substantially photo-realistic depictions.

26. The method of claim 18, further comprising:

generating the user-navigable 3-D virtual room by stitching the images of the physical room and a 3-D space model of the physical room together to link image data to corresponding locations in the 3-D space model, tagging depictions of one or more devices visible in the stitched images and 3-D space model with hit regions, and assigning appearance changes to the one or more devices in the tagged, stitched images and 3-D space model.

27. A non-transitory electronic device readable medium having software encoded thereon, the software, when executed on one or more processors of one or more electronic devices, operable to:

generate a user-navigable 3-D virtual room by stitching a plurality of images of the physical room captured from different respective positions in the physical room and a 3-D space model of the physical room together to link image data to corresponding locations in the 3-D space model, tagging depictions of one or more devices visible in the stitched images and 3-D space model with hit regions, and assigning appearance changes to the one or more devices in the tagged, stitched images and 3-D space model;

render and display the user-navigable 3-D virtual room from a perspective defined by a virtual camera;

receive an explicit navigation command or implicit action from a user;

in response to the explicit navigation command or implicit action, translate or rotate the virtual camera to alter a position or an orientation of the virtual camera;

re-render and display the user-navigable 3-D virtual room from a new perspective defined by the altered position or orientation, wherein the new perspective does not coincide with the position in the physical room from which any of the images were captured;

receive a user interaction associated with the user-navigable 3-D virtual room; and in response to the user interaction, cause the home automation system to change a state of a device in the physical room.

28. The non-transitory electronic device readable medium of claim 27, wherein the software when executed is further operable to:

dynamically update an appearance of the depiction of the device in the user-navigable 3-D virtual room to reflect the changed state.

\* \* \* \* \*